United States Patent
Kulberg et al.

(10) Patent No.: US 7,988,017 B2
(45) Date of Patent: Aug. 2, 2011

(54) METHODS AND APPARATUS FOR DISPENSING SOLID PHARMACEUTICAL ARTICLES

(75) Inventors: Kurt Kulberg, Hillsborough, NC (US); Bryan Patrick Farnsworth, Wake Forest, NC (US); Richard D. Michelli, Raleigh, NC (US); Stanley R. Buisman, Brooklyn Park, MN (US)

(73) Assignee: Parata Systems, LLC, Durham, NC (US)

( * ) Notice: Subject to any disclaimer, the term of this patent is extended or adjusted under 35 U.S.C. 154(b) by 615 days.

(21) Appl. No.: 12/121,951

(22) Filed: May 16, 2008

(65) Prior Publication Data
US 2008/0283540 A1 Nov. 20, 2008

Related U.S. Application Data

(60) Provisional application No. 61/019,069, filed on Jan. 4, 2008, provisional application No. 60/938,931, filed on May 18, 2007.

(51) Int. Cl.
*B65H 3/00* (2006.01)
(52) U.S. Cl. ........ 221/267; 221/156; 221/163; 221/211; 221/278
(58) Field of Classification Search .................. 221/156, 221/163, 211, 278
See application file for complete search history.

(56) References Cited

U.S. PATENT DOCUMENTS

| | | | | |
|---|---|---|---|---|
| 4,741,428 A | * | 5/1988 | Taniguchi et al. | 198/397.04 |
| 5,028,123 A | * | 7/1991 | Watanabe et al. | 359/418 |
| 5,740,747 A | * | 4/1998 | Stufflebeam et al. | 111/185 |
| 5,897,024 A | * | 4/1999 | Coughlin et al. | 221/135 |
| 6,085,938 A | | 7/2000 | Coughlin | |
| 6,519,890 B1 | * | 2/2003 | Otteman | 42/122 |
| 6,631,826 B2 | * | 10/2003 | Pollard et al. | 221/156 |
| 6,971,541 B2 | | 12/2005 | Williams et al. | |

FOREIGN PATENT DOCUMENTS
WO  WO 03/008308  1/2003

OTHER PUBLICATIONS

International Search Report and Written Opinion (11 pages) corresponding to International Application No. PCT/US2008/006317; Mailing Date: Sep. 1, 2008.
Official Action corresponding to Canadian Patent Application No. 2,683,186 dated Feb. 3, 2011; 3 pages.

* cited by examiner

*Primary Examiner* — Timothy R Waggoner
(74) *Attorney, Agent, or Firm* — Myers Bigel Sibley & Sajovec, PA

(57) ABSTRACT

An apparatus for dispensing pharmaceutical articles includes a housing assembly and an adjustment system. The housing assembly includes a first inlet wall and a second inlet wall that is moveable relative to the first inlet wall. The housing assembly defines a hopper chamber that houses pharmaceutical articles, and a dispensing channel fluidly connected to the hopper chamber. The dispensing channel has an inlet and an outlet and defines a flow path. The inlet is defined at least in part by the first and second inlet walls. The adjustment system is operable to adjust the position of the second inlet wall relative to the first inlet wall to adjust the size of the inlet to singulate the pharmaceutical articles passing through the inlet. The adjustment system includes an input mechanism and an operator feedback mechanism. The input mechanism is selectively operable by an operator to selectively move the second inlet wall relative to the first inlet wall. The operator feedback mechanism provides tactile and/or audible feedback to the operator responsive to operation of the input mechanism by the operator to indicate prescribed increments of movement of the second inlet wall relative to the first inlet wall.

33 Claims, 25 Drawing Sheets

US 7,988,017 B2

METHODS AND APPARATUS FOR DISPENSING SOLID PHARMACEUTICAL ARTICLES

RELATED APPLICATIONS(S)

The present application claims the benefit of U.S. Provisional Patent Application No. 61/019,069, filed Jan. 4, 2008, and U.S. Provisional Patent Application No. 60/938,931, filed May 18, 2007, the disclosures of which are hereby incorporated herein by reference in their entireties.

FIELD OF THE INVENTION

The present invention is directed generally to the dispensing of solid pharmaceutical articles and, more specifically, is directed to the automated dispensing of solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). The dispensing channel and inlet thereto may be adjustable in size and configuration using adjustment knobs.

SUMMARY OF THE INVENTION

According to embodiments of the present invention, an apparatus for dispensing pharmaceutical articles includes a housing assembly and an adjustment system. The housing assembly includes a first inlet wall and a second inlet wall that is moveable relative to the first inlet wall. The housing assembly defines a hopper chamber that houses pharmaceutical articles, and a dispensing channel fluidly connected to the hopper chamber. The dispensing channel has an inlet and an outlet and defines a flow path. The inlet is defined at least in part by the first and second inlet walls. The adjustment system is operable to adjust the position of the second inlet wall relative to the first inlet wall to adjust the size of the inlet to singulate the pharmaceutical articles passing through the inlet. The adjustment system includes an input mechanism and an operator feedback mechanism. The input mechanism is selectively operable by an operator to selectively move the second inlet wall relative to the first inlet wall. The operator feedback mechanism provides tactile and/or audible feedback to the operator responsive to operation of the input mechanism by the operator to indicate prescribed increments of movement of the second inlet wall relative to the first inlet wall.

According to method embodiments of the present invention, a method for dispensing pharmaceutical articles comprises providing an apparatus including a housing assembly and an adjustment system. The housing assembly includes a first inlet wall and a second inlet wall that is moveable relative to the first inlet wall. The housing assembly defines a hopper chamber that houses pharmaceutical articles, and a dispensing channel fluidly connected to the hopper chamber. The dispensing channel has an inlet and an outlet and defines a flow path. The inlet is defined at least in part by the first and second inlet walls. The adjustment system is operable to adjust the position of the second inlet wall relative to the first inlet wall to adjust the size of the inlet to singulate the pharmaceutical articles passing through the inlet. The adjustment system includes an input mechanism and an operator feedback mechanism. The input mechanism is selectively operable by an operator to selectively move the second inlet wall relative to the first inlet wall. The operator feedback mechanism provides tactile and/or audible feedback to the operator responsive to operation of the input mechanism by the operator to indicate prescribed increments of movement of the second inlet wall relative to the first inlet wall. The method further includes using the input mechanism to adjust the position of the second inlet wall relative to the first inlet wall to adjust the size of the inlet to singulate the pharmaceutical articles passing through the inlet.

Further features, advantages and details of the present invention will be appreciated by, those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
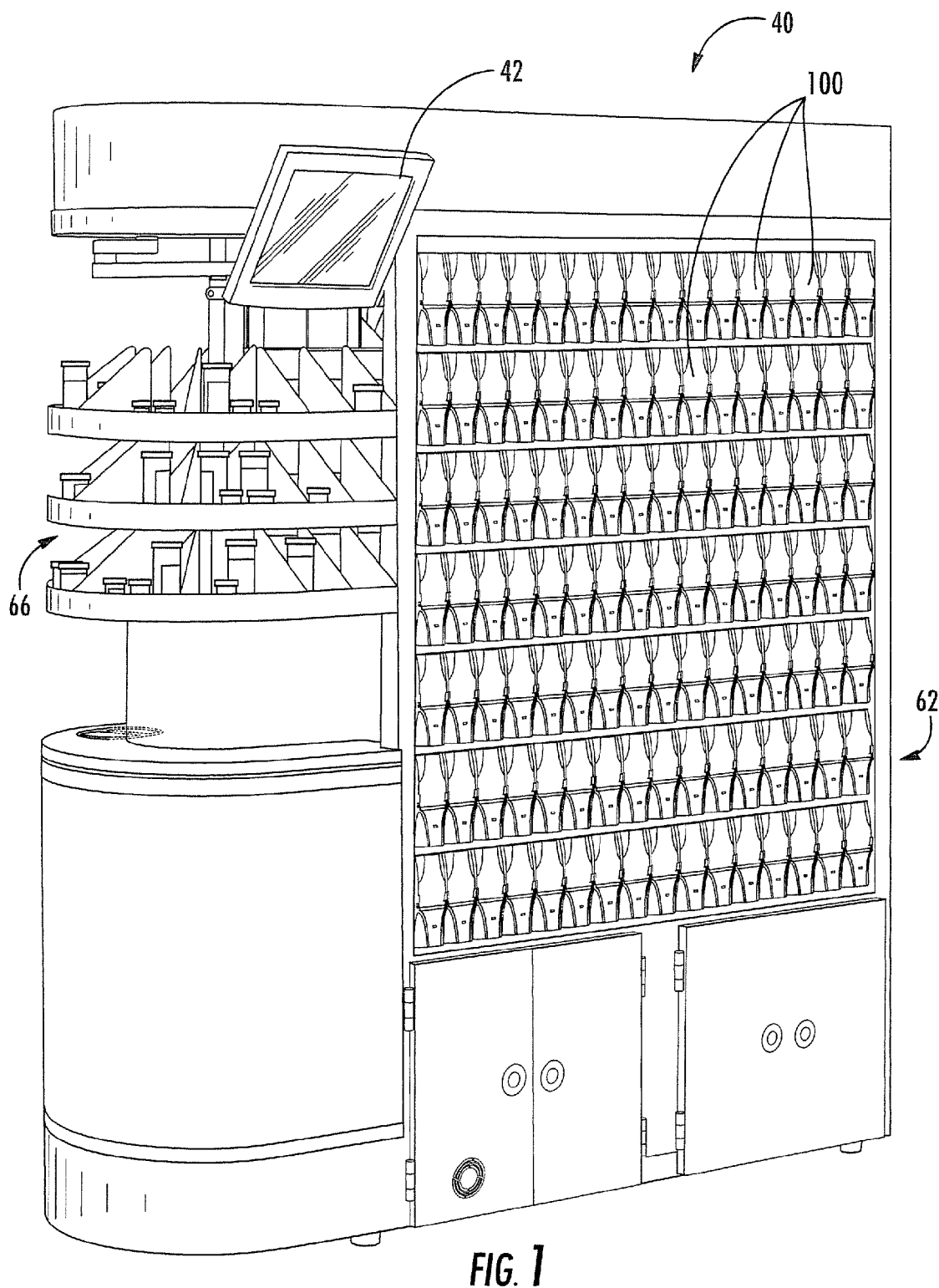
FIG. 1 is a perspective view of a pharmaceutical tablet dispensing system including an adjustment system according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with embodiments of the present invention, apparatus and methods are provided for dispensing solid pharmaceutical articles. In particular, such methods and apparatus may be used to dispense pharmaceutical pills or tablets. Operations according to embodiments of the present invention include providing an apparatus including a housing assembly and an adjustment system. The housing assembly includes a first inlet wall and a second inlet wall that is moveable relative to the first inlet wall. The housing assembly defines a hopper chamber that houses pharmaceutical articles, and a dispensing channel fluidly connected to the hopper chamber. The dispensing channel has an inlet and an outlet and defines a flow path. The inlet is defined at least in part by the first and second inlet walls. The adjustment system is operable to adjust the position of the second inlet wall relative to the first inlet wall to adjust the size of the inlet to singulate the pharmaceutical articles passing through the inlet. The adjustment system includes an input mechanism and an operator feedback mechanism. The input mechanism is selectively operable by an operator to selectively move the second inlet wall relative to the first inlet wall. The operator feedback mechanism provides tactile and/or audible feedback to the operator responsive to operation of the input mechanism by the operator to indicate prescribed increments of movement of the second inlet wall relative to the first inlet wall. The method further includes using the input mechanism to adjust the position of the second inlet wall relative to the first inlet wall to adjust the size of the inlet to singulate the pharmaceutical articles passing through the inlet.

Figure 2:
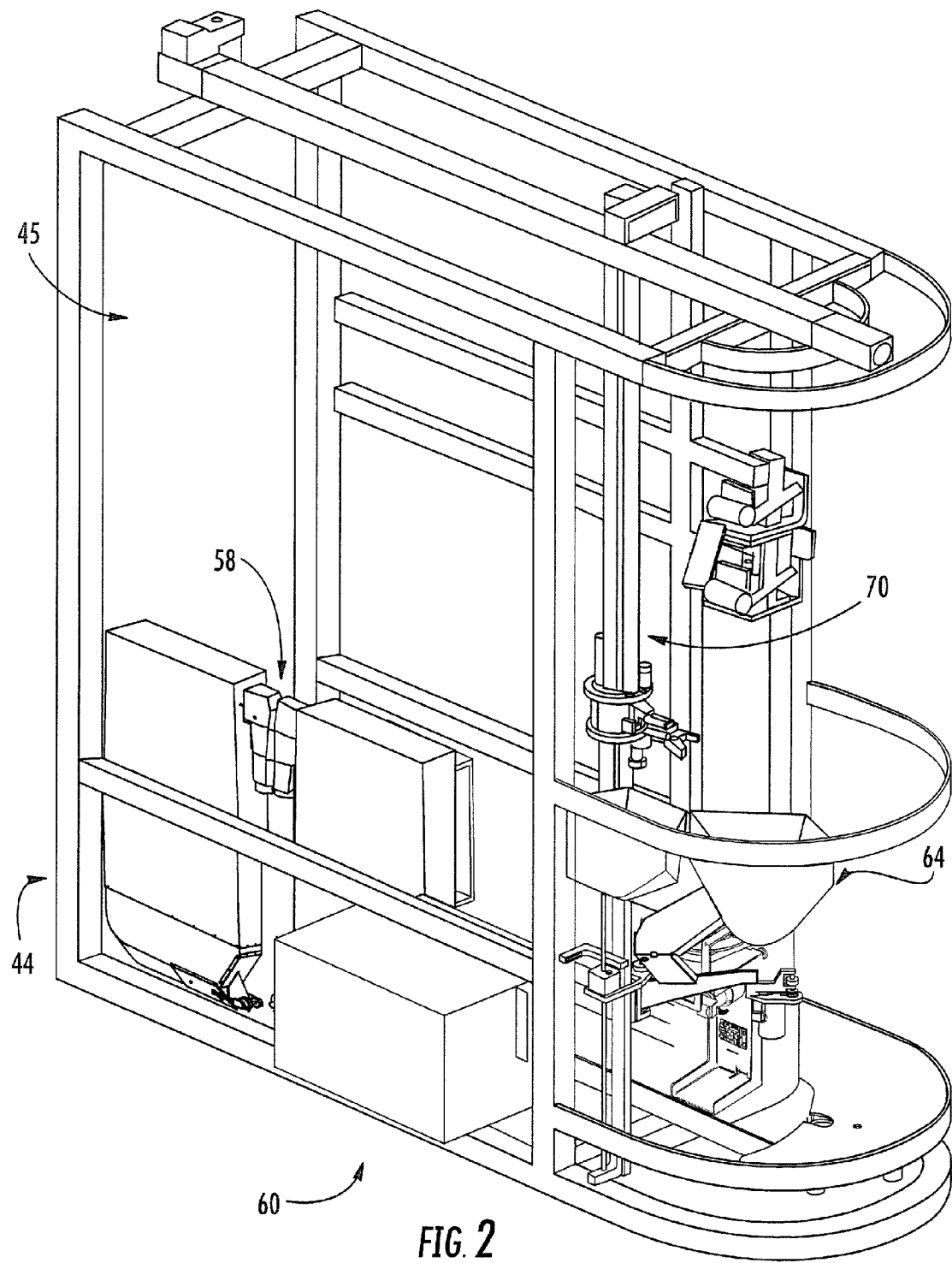
FIG. 2 is a cutaway view of the tablet dispensing system of FIG. 1 illustrating a container dispensing station, a labeling carrier, a dispensing carrier, and a closure dispensing station thereof.
Figure 3:
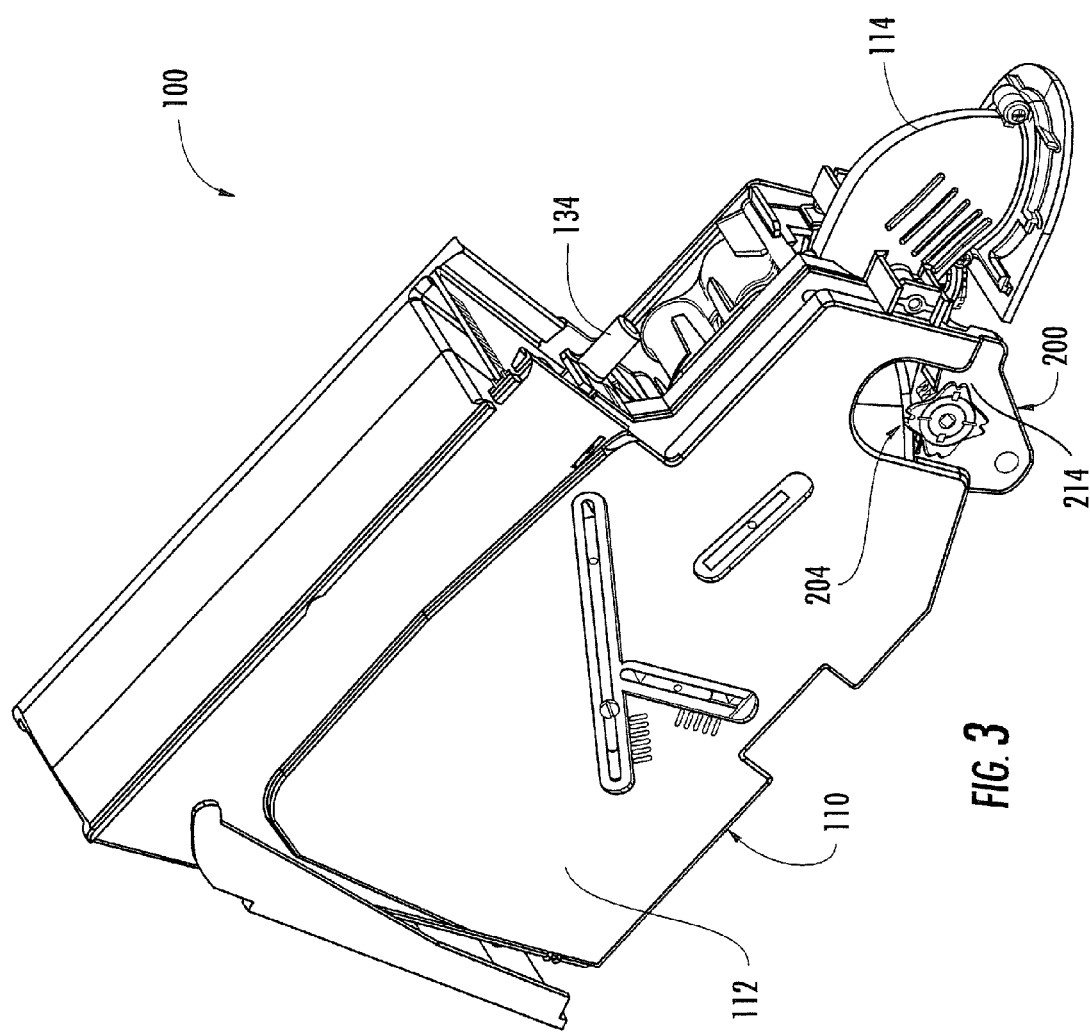
FIG. 3 is a front, left perspective view of a dispensing bin according to some embodiments of the present invention forming a part of the tablet dispensing system of FIG. 1.
Figure 4:
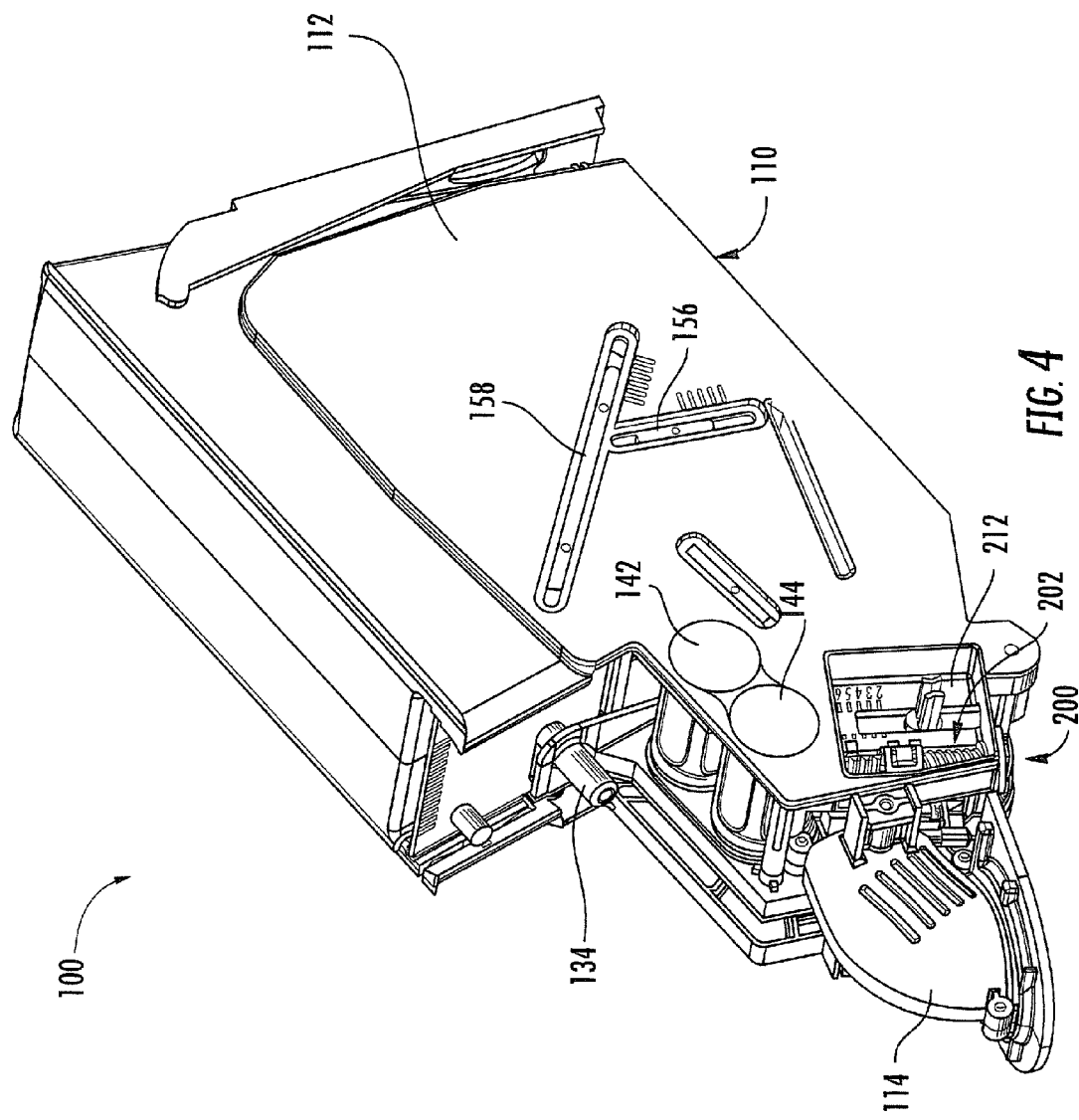
FIG. 4 is a front, right perspective view of the dispensing bin of FIG. 3.

A dispensing system according to embodiments of the present invention and that can carry out the foregoing methods is illustrated in FIGS. 1-18 and designated broadly therein at 40 (FIGS. 2 and 3). The dispensing system 40 includes a support frame 44 for the mounting of its various components. Those skilled in this art will recognize that the frame 44 illustrated herein is exemplary and can take many configurations that would be suitable for use with the present invention. The frame 44 provides a strong, rigid foundation to which other components can be attached at desired locations, and other frame forms able to serve this purpose may also be acceptable for use with this invention.

The system 40 generally includes as operative stations a controller (represented herein by a graphical user interface 42), a container dispensing station 58, a labeling station 60, a tablet dispensing station 62, a closure dispensing station 64, and an offloading station 66. In the illustrated embodiment, containers, tablets and closures are moved between these stations with a dispensing carrier 70; however, in some embodiments, multiple carriers are employed. The dispensing carrier 70 has the capability of moving the container to designated locations within the cavity 45 of the frame 44. Except as discussed herein with regard to the dispensing station 62, each of the operative stations and the conveying devices may be of any suitable construction such as those described in detail in U.S. Pat. No. 6,971,541 to Williams et al. and/or U.S. Pat. No. 7,344,049, the disclosures of which are hereby incorporated herein in their entireties.

The controller 42 controls the operation of the remainder of the system 40. In some embodiments, the controller 42 will be operatively connected with an external device, such as a personal or mainframe computer, that provides input information regarding prescriptions. In other embodiments, the controller 42 may be a stand-alone computer that directly receives manual input from a pharmacist or other operator. An exemplary controller is a conventional microprocessor-based personal computer.

In operation, the controller 42 signals the container dispensing station 58 that a container of a specified size is desired. In response, the container dispensing station 58 delivers a container for retrieval by the carrier 70. From the container dispensing station 58, the container is moved to the labeling station 60 by the carrier 70. The labeling station 60 includes a printer that is controlled by the controller 42. The printer prints and presents an adhesive label that is affixed to the container.

Figure 6:
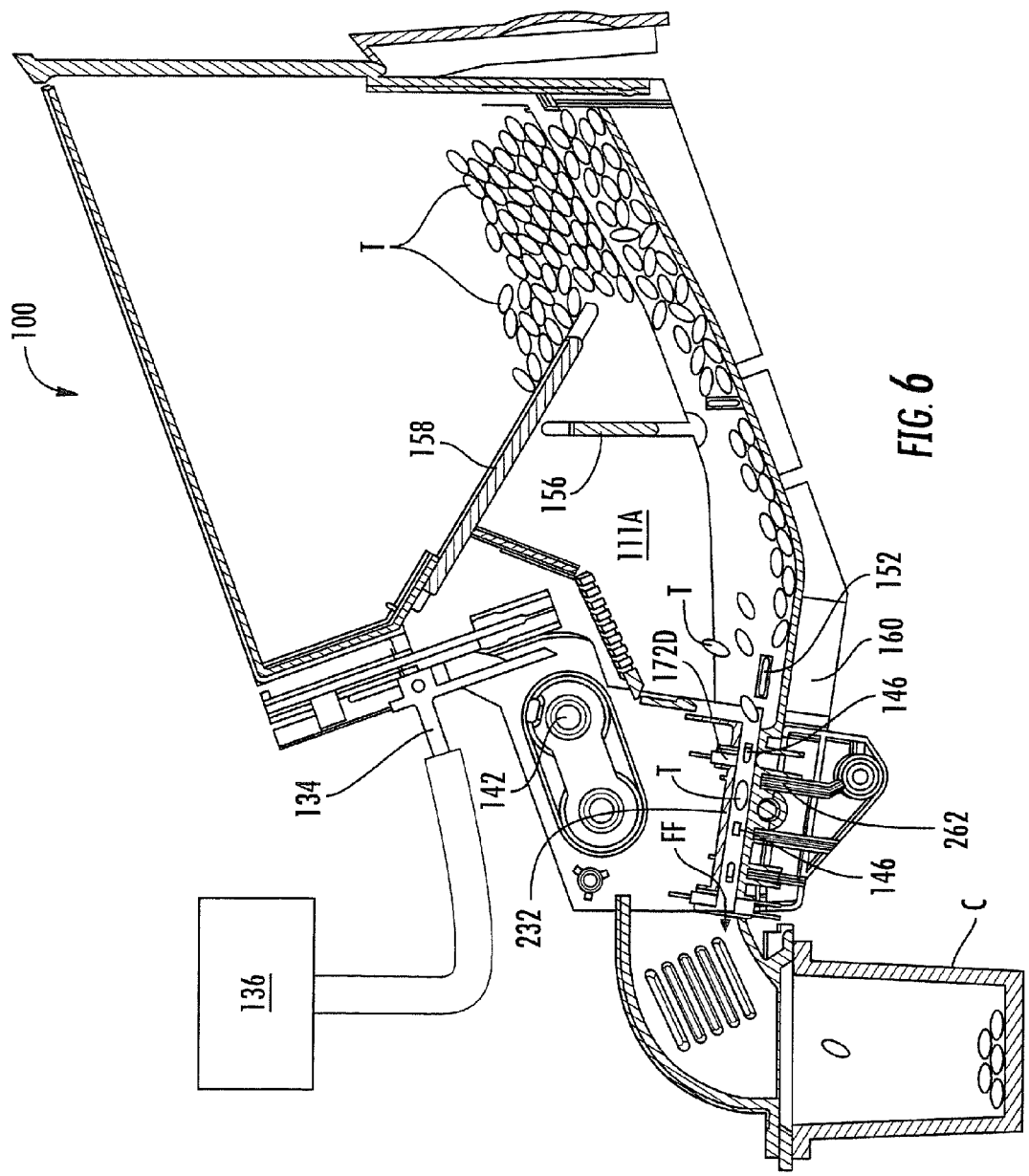
FIG. 6 is a cross-sectional view of the bin of FIG. 3 wherein tablets contained therein are being agitated and dispensed in a forward or dispensing direction.

Filling of labeled containers with tablets is carried out by the tablet dispensing station 62. The tablet dispensing station 62 comprises a plurality of tablet dispensing bin assemblies or bins 100 (described in more detail below), each of which holds a bulk supply of individual tablets (typically the bins 100 will hold different tablets). Referring to FIGS. 1 and 6, the dispensing bins 100, which may be substantially identical in size and configuration, are organized in an array mounted on the rails of the frame 44. Each dispensing bin 100 has a dispensing passage or channel 120 with an outlet 124 that faces generally in the same direction to create an access region for the dispensing carrier 70. The identity of the tablets in each bin is known by the controller 42, which can direct the dispensing carrier 70 to transport the container to the proper bin 100. In some embodiments, the bins 100 may be labeled with a bar code or other indicia to allow the dispensing carrier 70 to confirm that it has arrived at the proper bin 100.

The dispensing bins 100 are configured to singulate, count, and dispense the tablets contained therein, with the operation of the bins 100 and the counting of the tablets being controlled by the controller 42. Some embodiments may employ the controller 42 as the device which monitors the locations and contents of the bins 100; others may employ the controller 42 to monitor the locations of the bins, with the bins 100 including indicia (such as a bar code or electronic transmitter) to identify the contents to the controller 42. In still other embodiments, the bins 100 may generate and provide location and content information to the controller 42, with the result that the bins 100 may be moved to different positions on the frame 42 without the need for manual modification of the controller 42 (i.e., the bins 100 will update the controller 42 automatically).

Any of a number of dispensing units that singulate and count discrete objects may be employed if suitably modified to include the inventive aspects disclosed herein. In particular, dispensing units that rely upon targeted air flow and a singulating nozzle assembly may be used, such as the devices described in U.S. Pat. No. 6,631,826 to Pollard et al., U.S. Pat. No. 7,344,049, issued Mar. 18, 2008, U.S. patent application Ser. No. 11/750,710, and/or U.S. patent application Ser. No. 11/834,936, each of which is hereby incorporated herein by reference in its entirety. Bins of this variety may also include additional features, such as those described below.

After the container is desirably filled by the tablet dispensing station 62, the dispensing carrier 70 moves the filled container to the closure dispensing station 64. The closure dispensing station 64 may house a bulk supply of closures and dispense and secure them onto a filled container. The dispensing carrier 70 then moves to the closed container, grasps it, and moves it to the offloading station 66.

Turning to the bins 100 in more detail, an exemplary bin 100 is shown in more detail in FIGS. 3-18. The bin 100 includes a housing 110 having a hopper portion 112 and a nozzle 114. The bin 100 is fluidly connected with a pressurized gas source 136 (FIG. 6) as discussed in more detail below.

Figure 5:
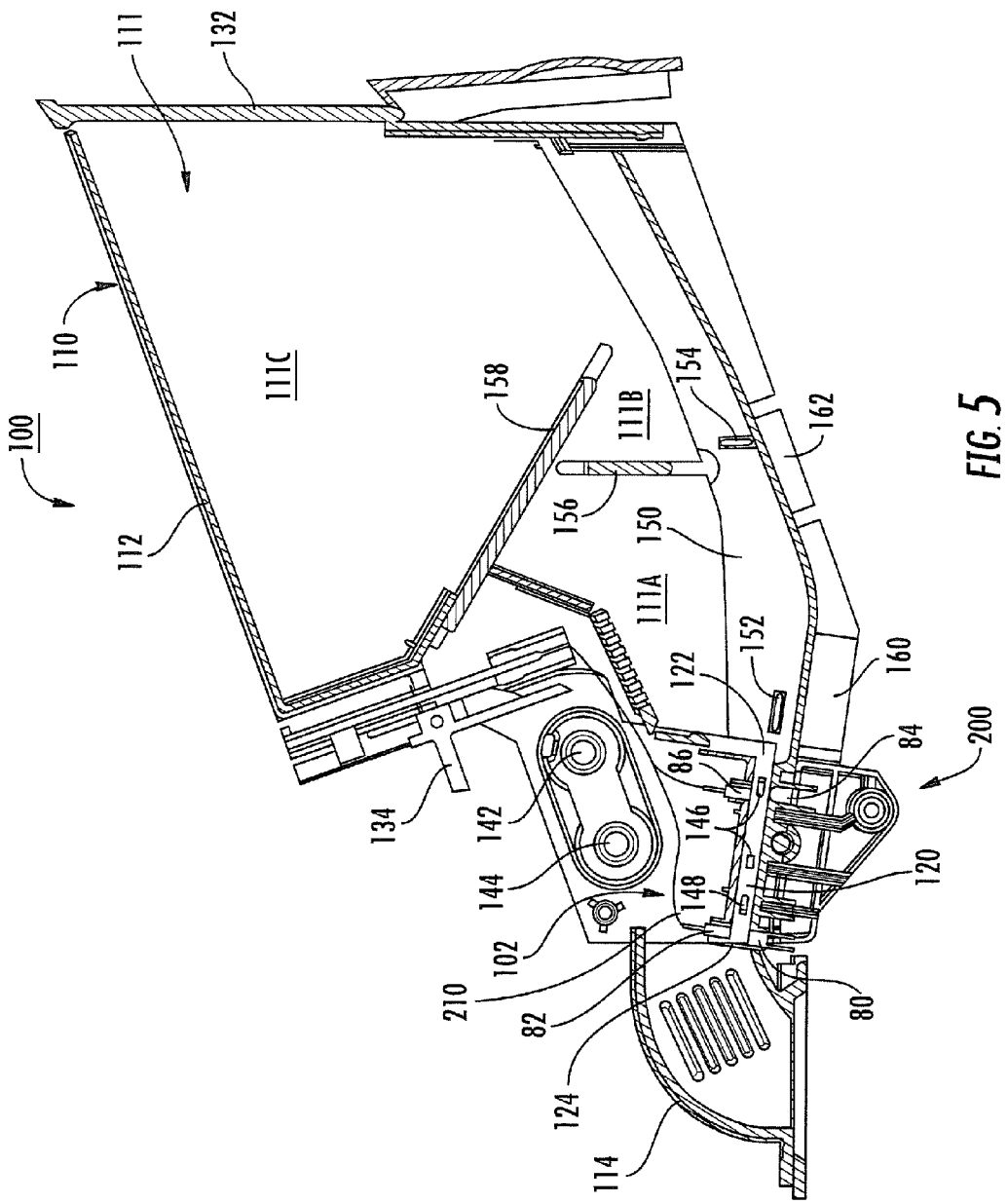
FIG. 5 is a cross-sectional view of the bin of FIG. 3.

Referring to FIG. 5, the hopper portion 112 defines a hopper chamber 111 that can be filled with tablets T. The bin 100 can be filled or replenished with tablets through an opening located at the upper rear portion of the bin 100. The opening is selectively accessible via a pivoting door 132, for example.

The tablets T can be dispensed one at a time into the container C (FIG. 6) through the dispensing channel 120. The dispensing channel 120 has an inlet 122 adjacent and fluidly connecting the channel 120 to the hopper chamber 111. The dispensing channel 120 includes the outlet 124 downstream from and opposite the inlet 122 and through which tablets may exit to be dispensed into the container C. The bin 100 defines a tablet dispensing path from the inlet 122, through the dispensing channel 120, through the outlet 124, and through the nozzle 114. According to some embodiments and as illustrated, the dispensing channel 120 is uniformly rectangular in cross-section from the inlet 122 to the outlet 124.

The hopper portion 112 has a bottom wall defining a floor 150. The floor 150 has a sloped rear portion that slopes downwardly toward the inlet 122. The floor 150 also has a funnel-shaped front portion. A front agitation port or outlet 152 and a rear agitation port or outlet 154 are provided in the floor 150. As discussed below, air or other pressurized gas can be flowed through the outlets 152, 154 and into the hopper chamber 111 to agitate the tablets T contained therein.

A front partition or divider wall 156 extends through the hopper chamber 111 and forms a gap or choke point between the lower edge of the wall 156 and the floor 150. According to some embodiments, the choke point has a gap spacing or height from the floor 150 of between about 0.25 and 0.75 inch. The position of the wall 156, and thereby the gap spacing, may be selectively adjusted using an adjustment mechanism.

A rear partition or divider wall 158 extends through the hopper chamber 111 and forms a gap or choke point between the lower edge of the wall 158 and the floor 150. According to some embodiments, the choke point has a gap spacing or height from the floor 150 of between about 0.6 and 1 inch. The position of the wall 158, and thereby the gap spacing, may be selectively adjusted using an adjustment mechanism. According to some embodiments, the rear divider wall 158 forms an angle of at least about 30 degrees with respect to horizontal and, according to some embodiments, between about 30 and 45 degrees with respect to horizontal.

The front divider wall 156 and the rear divider wall 158 divide the hopper chamber 111 into subchambers or regions. More particularly and referring to FIG. 5, a front region or subchamber 111A is defined between the divider wall 156 and the inlet 122, an intermediate region or subchamber 111B is defined between the front divider wall 156 and the rear divider wall 158, and a rear region or subchamber 111C is defined between the rear divider wall 158 and the rear wall of the bin 100.

The housing 110 further includes a high pressure supply port or nozzle 134. In use, the pressurized gas source 136 (FIG. 6) is fluidly connected to the high pressure nozzle 134 via a manifold, fitting, flexible or rigid conduit, or the like. The gas source 136 may include a compressor or a container of compressed gas, for example. The high pressure gas source 136 is operative to provide a supply gas flow of a suitable working gas at a high pressure to the nozzle 134. According to some embodiments, the supplied gas is or includes air. According to some embodiments, the pressure of the supplied gas at the nozzle 134 is at least about 10 psi and, according to some embodiments, between about 10 and 60 psi.

A gas supply passage or conduit fluidly connects the high pressure nozzle 134 to a forward control valve 142 (FIG. 5). Two forward jet supply passages fluidly connect the forward control valve 142 to respective forward drive jet apertures or outlets 146. The forward jet outlets 146 are positioned and configured to direct air or other supplied gas into the dispensing channel 120. A front agitation supply passage fluidly connects the forward control valve 142 to a front air amplifier 160. The front air amplifier 160 is positioned and configured to direct air or other supplied gas into the hopper chamber 111 through the front agitation outlet 152. The forward control valve 142 is operable to control airflow to the forward jet outlets 146 and the front air amplifier 160.

A further gas supply passage or conduit fluidly connects the high pressure nozzle 134 to a reverse control valve 144 (FIG. 5). A reverse jet supply passage fluidly connects the reverse control valve 144 to a reverse drive jet aperture or outlet 148. The reverse jet outlet 148 is positioned and configured to direct air or other supplied gas into the dispensing channel 120. A rear agitation supply passage fluidly connects the reverse control valve 144 to a rear air amplifier 162. The rear air amplifier 162 is positioned and configured to direct air or other supplied gas into the hopper chamber 111 through the rear agitation outlet 154. The reverse control valve 144 is operable to control airflow to the reverse jet outlet 148 and the rear air amplifier 162.

In use, the air amplifiers 160, 162 can be used to convert a supplied pressurized gas flow having a given pressure, velocity and mass flow rate into an exiting or output air flow having a comparatively lower pressure, higher velocity, and higher mass flow rate. According to some embodiments, the air amplifiers 160, 162 utilize the Coanda effect. The outlets of the air amplifiers 160, 162 are positioned in or adjacent the agitation outlets 152, 154, respectively, so that the exit gas flow enters the hopper chamber 111 through the agitation outlets 152, 154. The air amplifiers 160, 162 may be constructed and/or operate in the manner disclosed in U.S. patent application Ser. No. 11/750,710, the disclosure of which is incorporated herein by reference. Each of the air amplifiers 160, 162 may be secured to the housing 110.

According to some embodiments and as illustrated, the drive jet outlets 146, 148 and the agitation outlets 152, 154 are fluidly connected to the pressurized gas source 136 via the same intake (i.e., the nozzle 134). According to some embodiments, a single gas source is used to supply all drive jet outlets and agitation outlets. According to some embodiments, the pressure of the gas supplied to each air amplifier 160, 162 is substantially the same as the pressure of the gas supplied to each drive jet outlet 146, 148.

Alternative mechanisms may be used to provide the agitation gas flows discussed herein. For example, the system 40 may provide agitation flow using a separate low pressure manifold as disclosed in U.S. Pat. No. 7,344,049.

With reference to FIGS. 8-15, the bin 100 further includes an adjustable dispensing channel subassembly 200. The subassembly 200 includes an adjustment system, which includes input mechanisms for adjusting the height and width of the inlet 122 and the dispensing channel 120, as well as operator feedback mechanisms to assist the operator in making such adjustments. The subassembly 200 includes portions of the housing 110, a height adjustment mechanism 202 and a width adjustment mechanism 204.

Figure 8:
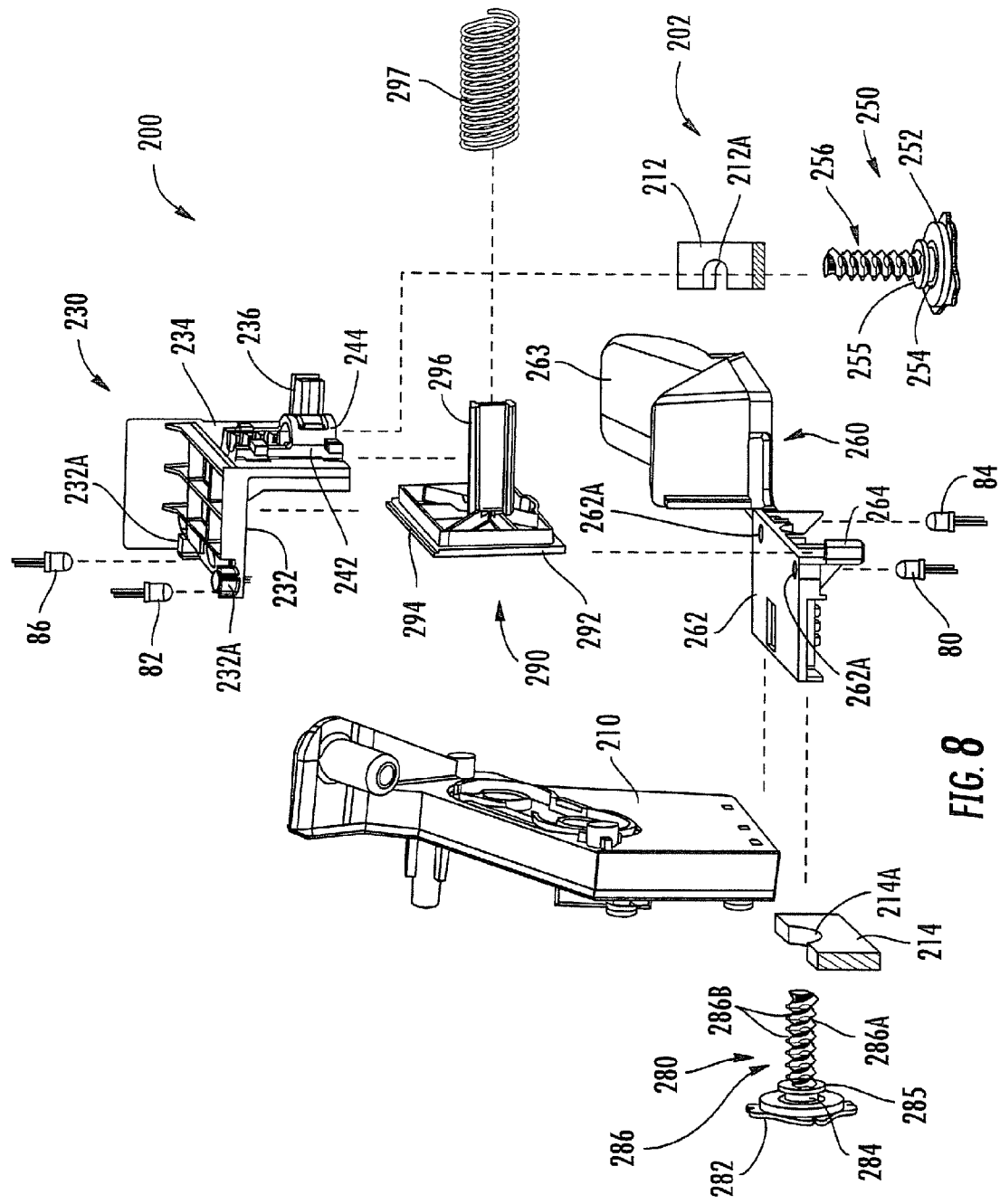
FIG. 8 is an exploded, front, right perspective view of an adjustable dispensing channel subassembly forming a part of the bin of FIG. 3.
Figure 13:
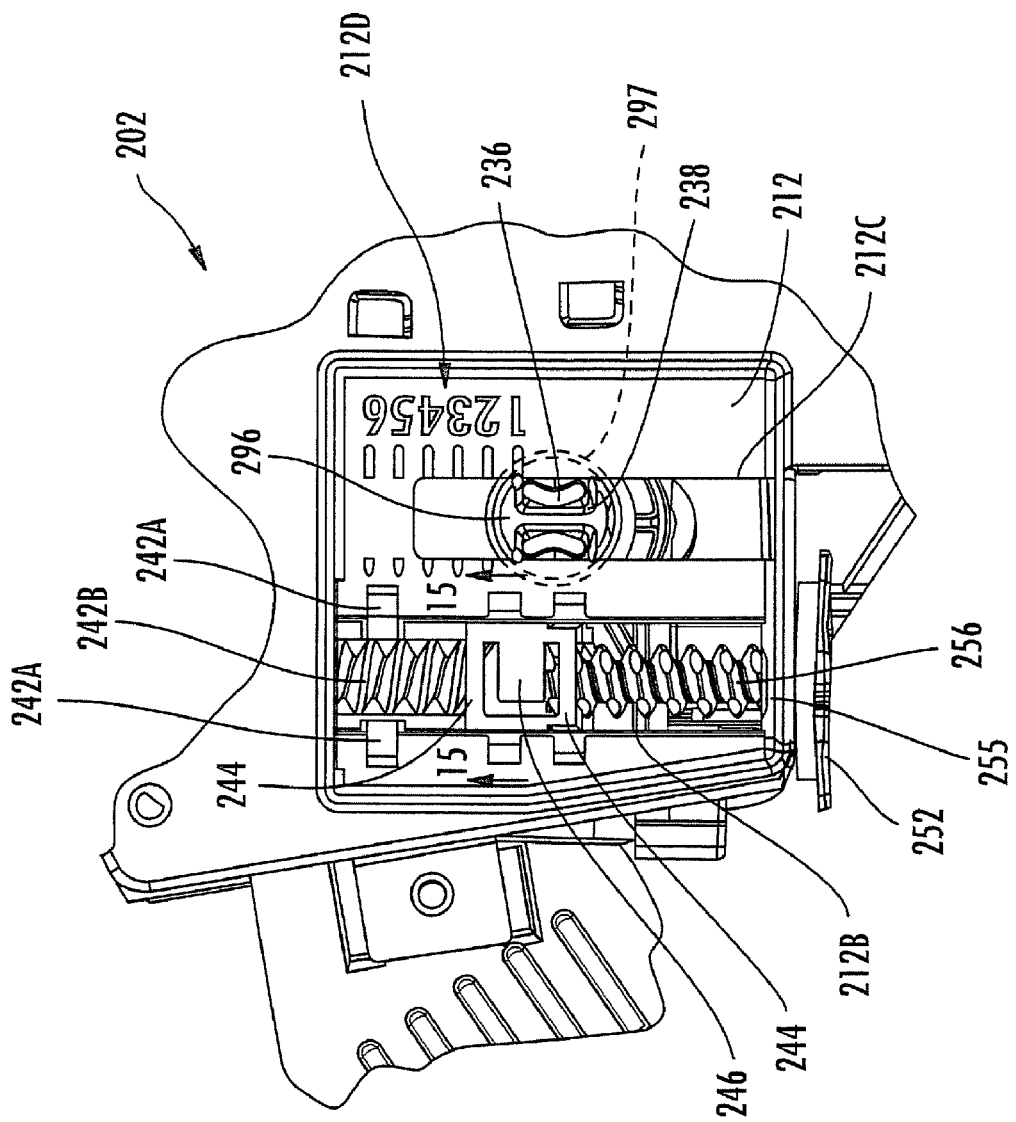
FIG. 13 is an enlarged, fragmentary, side view of the bin of FIG. 3.
Figure 14:
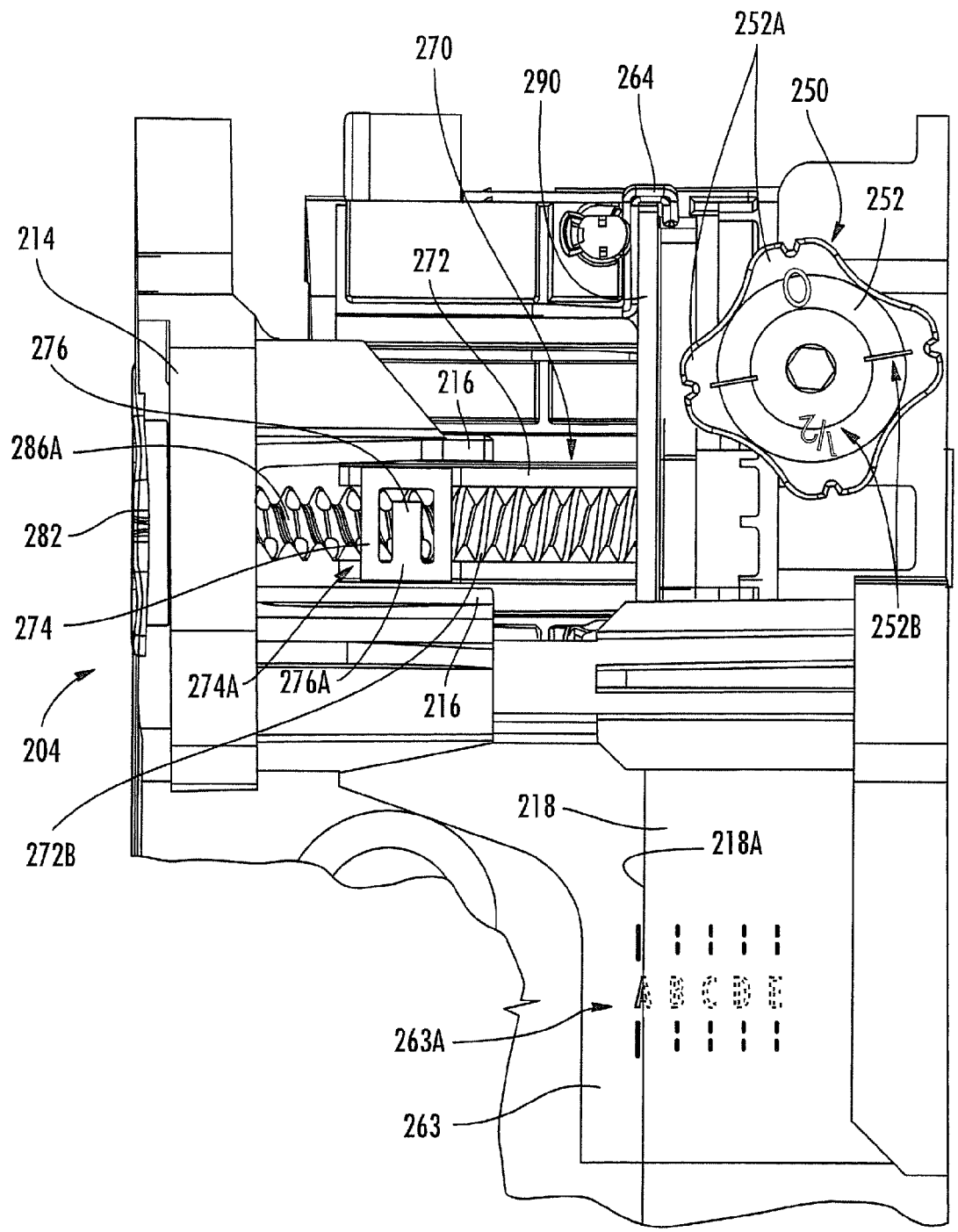
FIG. 14 is an enlarged, fragmentary, bottom view of the bin of FIG. 3.

The housing 110 includes a fixed or stationary wall 210 (FIGS. 5 and 11), a right sidewall 212 (FIGS. 4, 8 and 13), and a left sidewall 214 (FIGS. 3, 8 and 14).

A screw retaining slot 212A (FIG. 8), a first guide slot 212B (FIG. 13), and a second slot 212C (FIG. 13), are formed in the right sidewall 212. Indicia 212D (FIG. 13) such as "1", "2", "3", "4", "5", and "6" with index markings are provided on the sidewall 212 along the slot 212C. The indicia 212D may be printed, embossed or defined by raised portions, for example.

A screw retaining slot 214A (FIG. 8) is defined in the left sidewall 214. Housing guide arms 216 (FIG. 14) extend from the left sidewall 214 horizontally and widthwise across the bottom of the housing 110.

Figure 16:
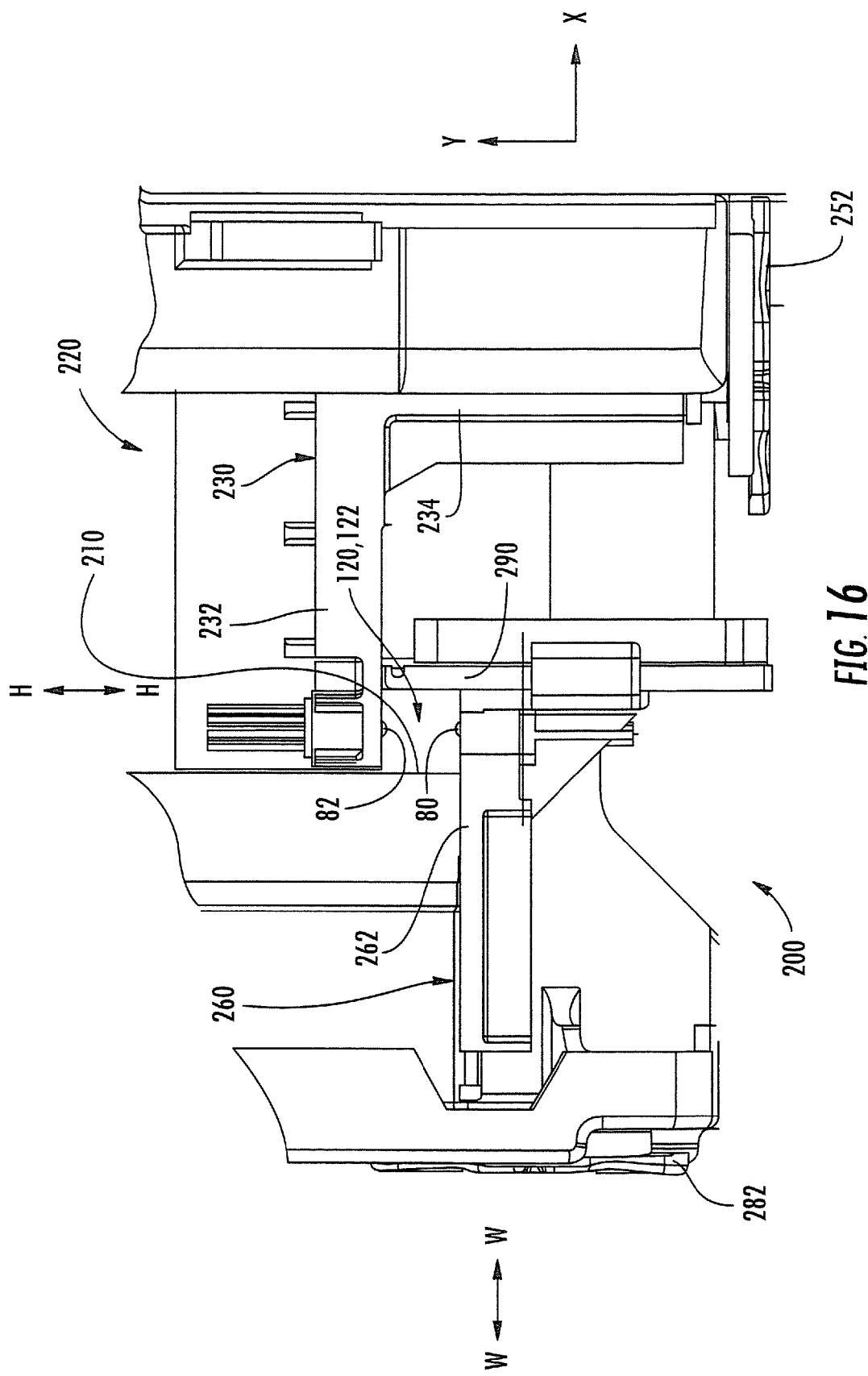
FIG. 16 is an enlarged, fragmentary, front end view of the bin of FIG. 4 with a nozzle thereof removed, wherein the dispensing channel subassembly thereof is positioned in a first position.

The housing 110 also includes a bottom wall 218 having a side edge 218A (FIG. 14). The housing 110 (including the stationary wall 210 and the right sidewall 212) generally defines a cavity 220 within which the dispensing channel subassembly 200 resides (FIG. 16). The stationary sidewall 210 is fixed with respect to and may be secured to or integrally formed with the right sidewall 212 and the left sidewall 214 of the housing 110. The drive jet outlets 146, 148 are formed in the stationary sidewall 210.

With reference to FIG. 8, the height adjustment mechanism 202 includes a ceiling member 230 and an adjuster screw member 250. The ceiling member 230 includes a ceiling wall 232 and a sidewall 234. Mounting bores 232A are defined in the ceiling wall 232 and hold the photodetectors 82, 86. A guide post 236 extends laterally outwardly from the sidewall 234. Guide openings 238 (FIG. 13) are defined in the sidewall 234 on either side of the guide post 236.

Figure 10:
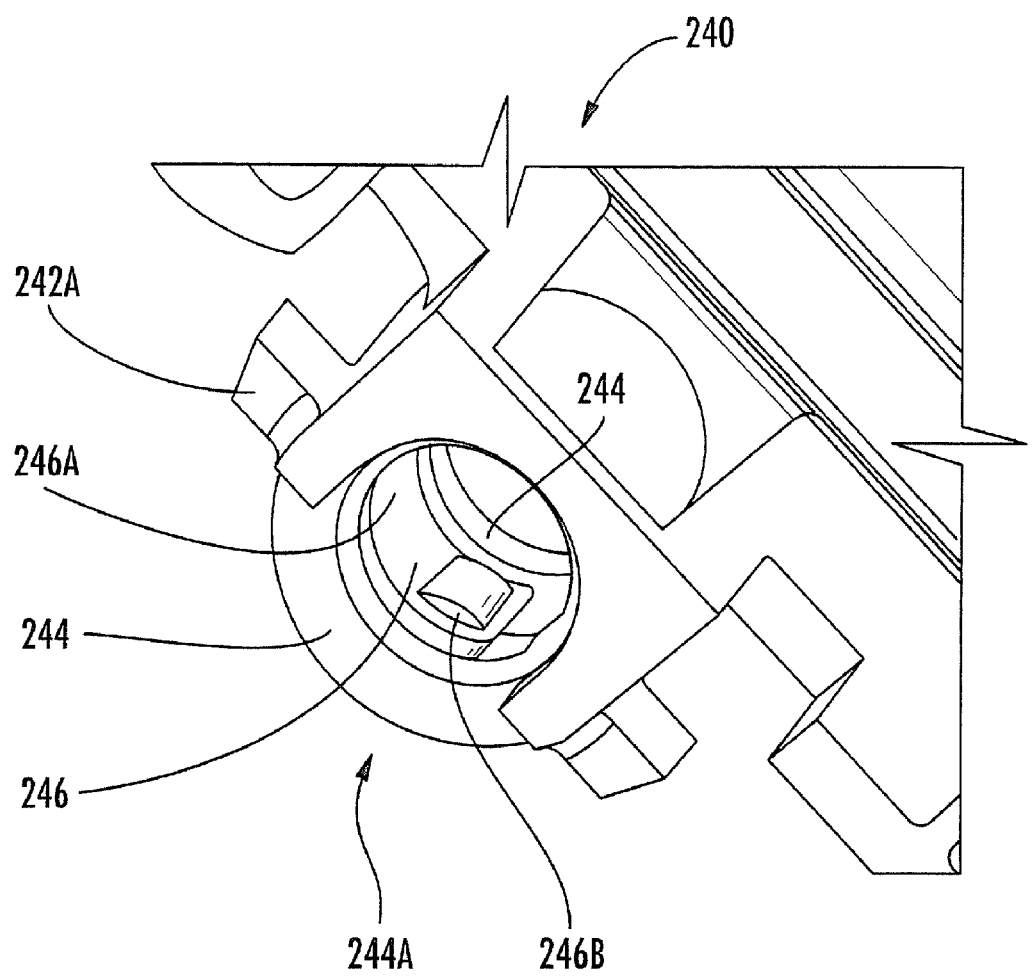
FIG. 10 is an enlarged, front perspective view of a receiver portion forming a part of the adjustable dispensing channel subassembly of FIG. 8.
Figure 11:
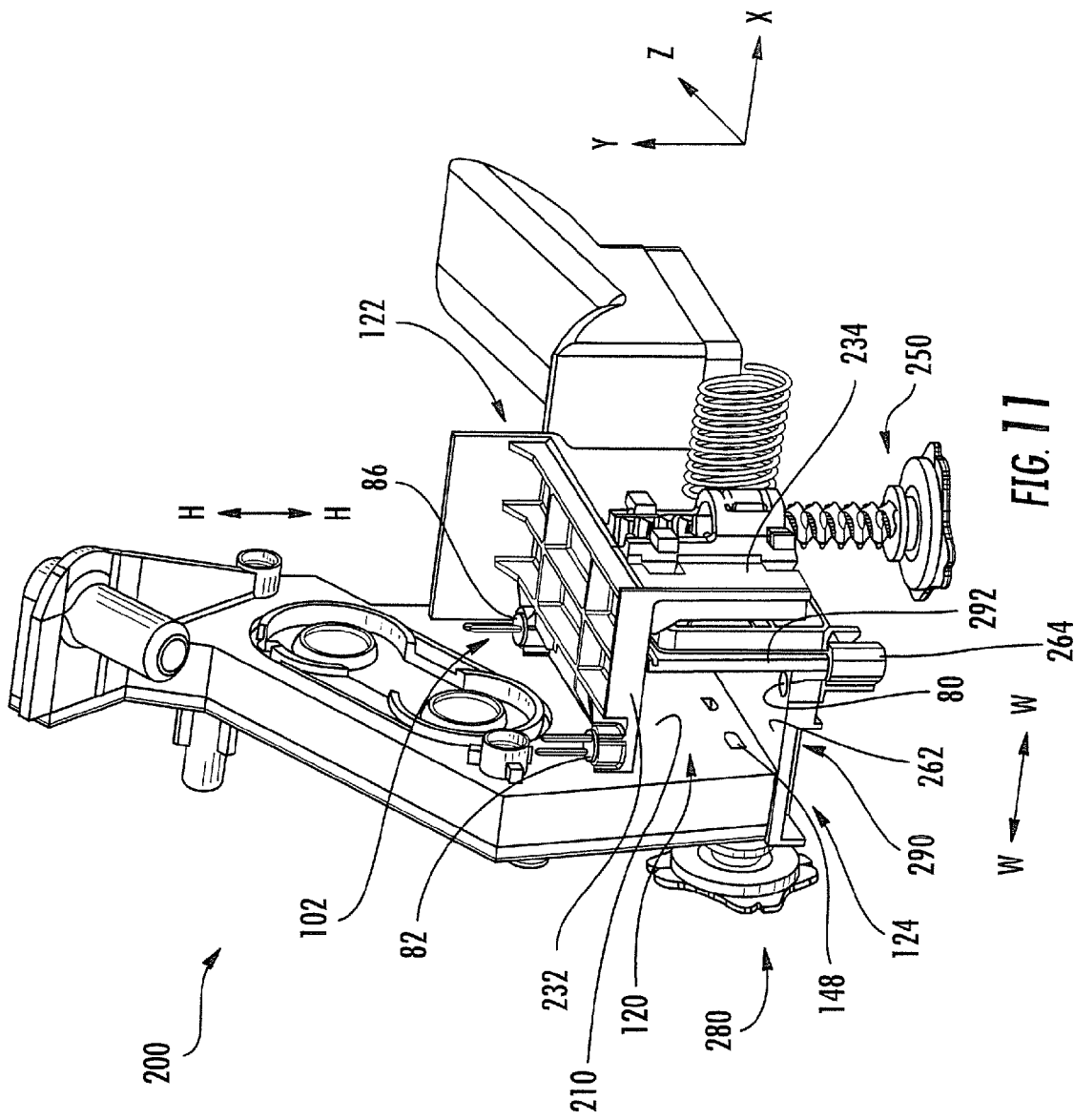
FIG. 11 is a front, right perspective view of the adjustable dispensing channel subassembly of FIG. 8.

With reference to FIGS. 8, 10, and 13, a receiver portion 240 is located on the sidewall 234. The receiver portion 240 includes a rib 242. Tabs 242A extend laterally from the rib 242 and screw threads 242B are defined in the rib 242. A pair of retainer collars 244 extend from the rib 242 and define a bore or opening 244A (FIG. 10). With reference to FIG. 10, an arm or tab 246 extends from the rib 242 and overlies the bore 244A. The tab 246 is joined to the rib 242 at a pivot end 246A of the tab 246 so that the tab 246 is cantilevered over the bore 244A. The tab 246 is formed of a resilient material and shaped or geometrically configured so that it may be elastically deflected about the pivot end 246A. A projection 246B is located on the inner side of the tab 246 opposite the pivot end 246A. The tab 246 may be integrally formed (e.g., molded) with the rib 242 and the remainder of the receiver portion 240 as illustrated.

Figure 9:
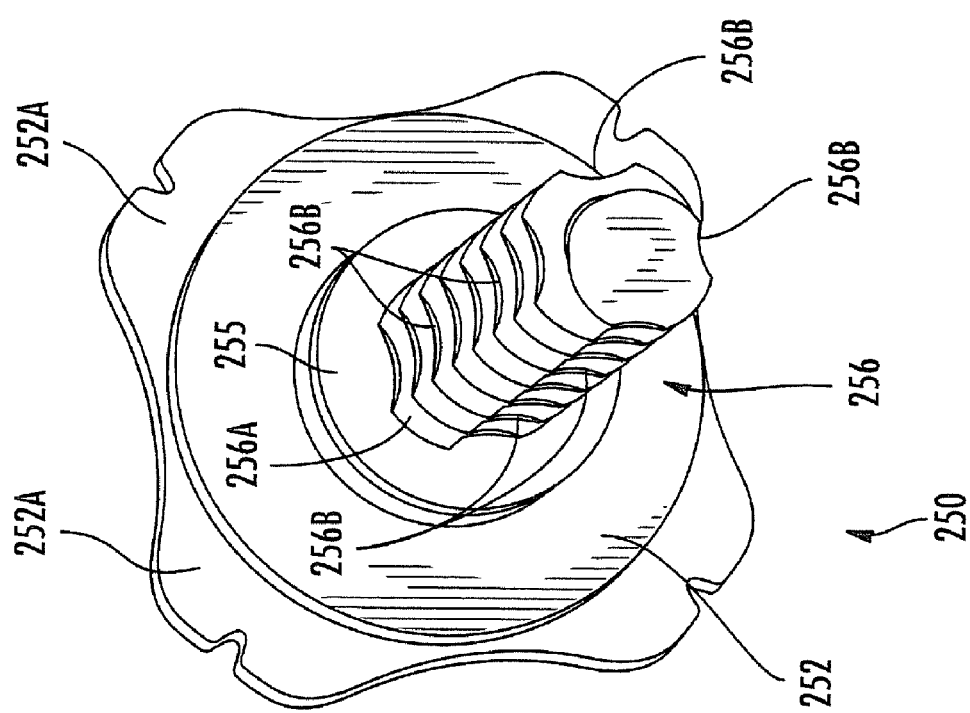
FIG. 9 is an enlarged, front perspective view of an adjustment screw member forming a part of the adjustable dispensing channel subassembly of FIG. 8.

With reference to FIGS. 8 and 9, the screw member 250 includes a head or knob 252, an upper shank section 254, a lower shank portion 256, and a flange 255 separating the shank portions 254, 256. The upper shank portion 254 is smooth and the lower shank portion 256 includes outer threads 256A (FIG. 9). Detents 256B (FIG. 9) are defined in the threads 256A. The knob 252 has four equally circumferentially spaced apart tabs 252A (FIG. 9). Indicia 252B (FIG. 14) such as "0", "½" and "-" are provided on the knob 252. The indicia 252B may be printed, embossed or defined by raised portions, for example. The screw member 250 may be a thumbscrew as illustrated; however, other shapes and configurations may be provided in accordance with other embodiments of the present invention.

The detents 256B (FIG. 9) are circumferentially spaced apart about the shank portion 256. The detents 256B are arranged in four circumferentially equally spaced apart groups of detents, wherein the detents 256B of each group are axially aligned. According to some embodiments, the detents 256B are rounded or curvilinear and, according to some embodiments, concave (as shown). According to some embodiments, the detents 256B each have a depth-to-width ratio of between about 1:8 and 1:4. Other configurations of detents may be provided in accordance with other embodiments of the present invention.

The ceiling member 230 (FIG. 8) is slidably mounted inside the cavity 220 (FIG. 16) such that the rib 242 is slidably received in the slot 212B of the right sidewall 212 and secured therein by the tabs 242A (FIG. 13). The guide post 236 slidably extends through the slot 212C. The adjuster screw member 250 extends through the screw retaining slot 212A in the right sidewall 212 and through the bore 244A in the receiver portion 240 of the ceiling member 230. The upper shank portion 254 is received in the slot 212A such that the screw member 250 is rotatable about its lengthwise axis in the slot 212A but is prevented by the knob 252 and the flange 255 from moving axially relative the housing 110. The threads 256A of the lower shank portion 256 threadedly engage or mate with the threads 242B and the indexing projection 246B (FIG. 10). In use, the ceiling member 230 can be raised and lowered along the axis H-H (FIG. 11) by rotating the screw member 250 in either direction.

With reference to FIGS. 8 and 14, the width adjustment mechanism 204 includes a floor member 260, an adjuster screw member 280, and a follower member 290. The floor member 260 includes a floor wall 262 and a rear portion 263. The rear portion 263 may serve as a movable floor or ramp portion in the hopper chamber 112A adjacent the inlet 122. Indicia 263A (FIGS. 12 and 14) such as "A", "B", "C", and "E" are provided on the underside of the rear portion 263. The indicia 263A may be printed, embossed or defined by raised portions, for example.

Mounting bores 262A are defined in the floor wall 262 and hold the photoemitters 80, 84 (FIG. 8). A follower guide flange 264 extends from the front edge of the floor member 260 and defines a vertical groove.

Figure 12:
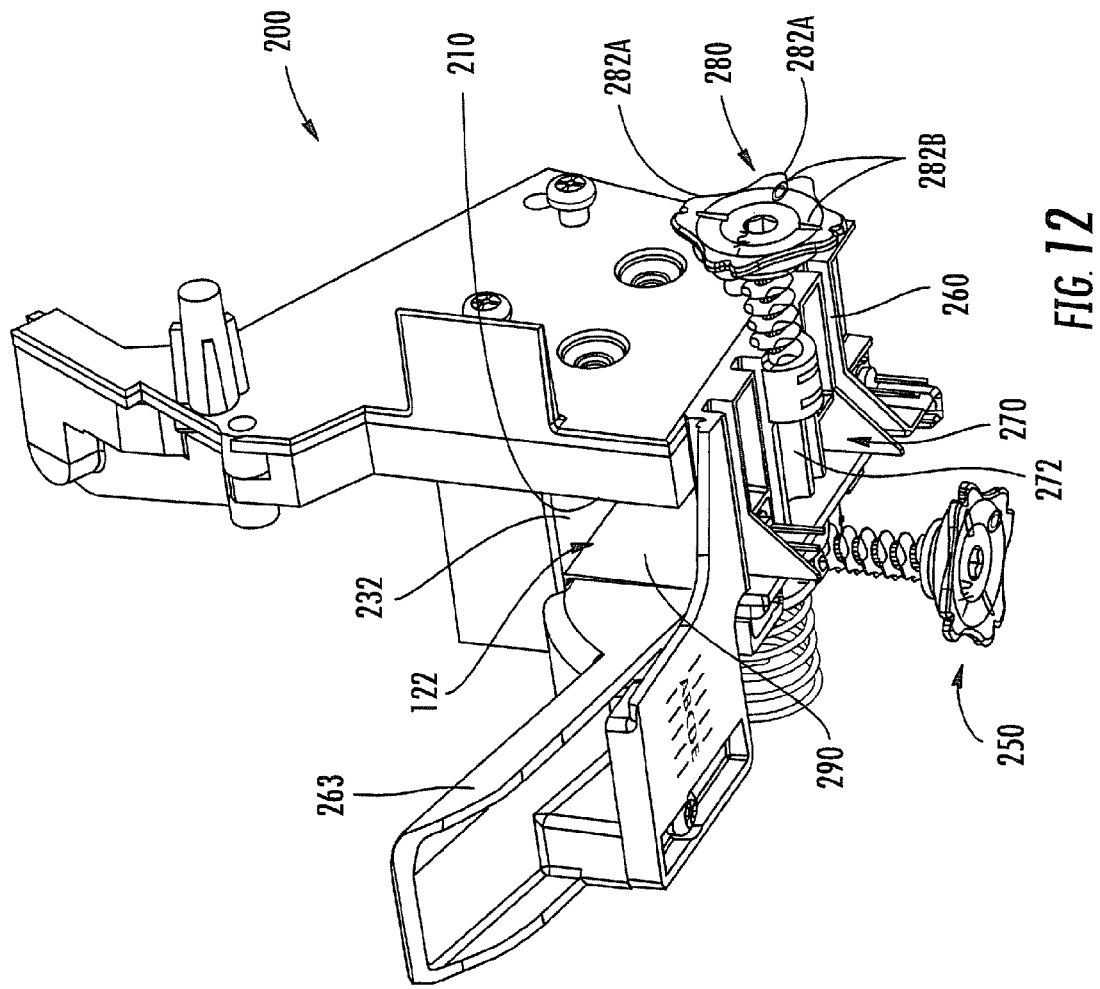
FIG. 12 is a left, rear perspective view of the adjustable dispensing channel subassembly of FIG. 8.

With reference to FIGS. 12 and 14, a receiver portion 270 is located on the underside of the floor wall 262. The receiver portion 270 includes a rib 272. Screw threads 272B are defined in the rib 272. A pair of retainer collars 274 extend from the rib 272 and define a bore or opening 274A. An arm or tab 276 extends from the rib 272 and overlies the bore 274A. The tab 276 is joined to the rib 272 at a pivot end 276A of the tab 276 so that the tab 276 is cantilevered over the bore 274A. The tab 276 is formed of a resilient material so that it may be elastically deflected about the pivot end 276A. A projection (not shown) corresponding to the projection 246B is located on the inner side of the tab 276 opposite the pivot end 276A.

With reference to FIG. 8, the screw member 280 may be configured in the same manner as the screw member 250 and includes a head or knob 282, an upper shank section 284, a lower shank portion 286, and a flange 285 separating the shank portions 284, 286. The upper shank portion 284 is smooth and the lower shank portion 286 includes outer threads 286A. Detents 286B are defined in the threads 286A. The knob 282 has four equally circumferentially spaced apart indicator tabs 282A. Indicia 282B (FIG. 12) such as "0", "½" and "-" are provided on the knob 282. The indicia 282B may be printed, embossed or defined by raised portions, for example. The screw member 280 may be a thumbscrew as illustrated; however, other shapes and configurations may be provided in accordance with other embodiments of the present invention. The screw member 280 and the tab 276 may be configured and sized as discussed above with regard to the screw member 250 and the tab 246.

The floor member 260 is slidably mounted inside the cavity 220 such that the rib 272 is slidably received between the guide arms 216. The adjuster screw member 280 extends through the screw retaining slot 214A in the left sidewall 214 and through the bore 274A in the receiver portion 270 of the floor member 260. The upper shank portion 284 is received in the slot 214A such that the screw member 280 is rotatable about its lengthwise axis in the slot 214A but is prevented by the knob 282 and the flange 285 from moving axially relative the housing 110. The threads 286A of the lower shank portion 286 threadedly engage or mate with the threads 272B and the projection (not shown) of the tab 276. In use, the floor member 260 can be slid left and right along the axis W-W by rotating the screw member 280 in either direction.

With reference to FIG. 8, the follower member 290 includes a guide flange 292 on a front edge thereof and a sealing flange 294 on a top edge thereof. The guide flange 292 is slidably received in the groove of the follower guide flange 264. The sealing flange 294 slidably abuts the ceiling wall 232. A guide post 296 extends rightwardly from the follower member 290, through the guide openings 238, and through the slot 212C (FIG. 13). A spring 297 surrounds the guide posts 236, 296 and is captured and compressed between the follower member 290 and the sidewall 234 to bias the follower member 290 against the floor wall 262.

The ceiling wall 232, the floor wall 262, the stationary wall 210, and the follower member 290 serve as the top, bottom, left and right walls, respectively, defining the dispensing channel 120 and the inlet 122 (See, e.g., FIGS. 12 and 16). The ceiling wall 232, the floor wall 262, and the follower member 290 are moveable relative to the housing 110 and one another as discussed below to selectively change the width and/or the height of the dispensing channel 120 and the inlet 122. In this manner, the adjustment mechanisms 202, 204 can be used as input mechanisms to selectively change and set the configuration of the inlet 122 and the dispensing channel 120.

Figure 17:
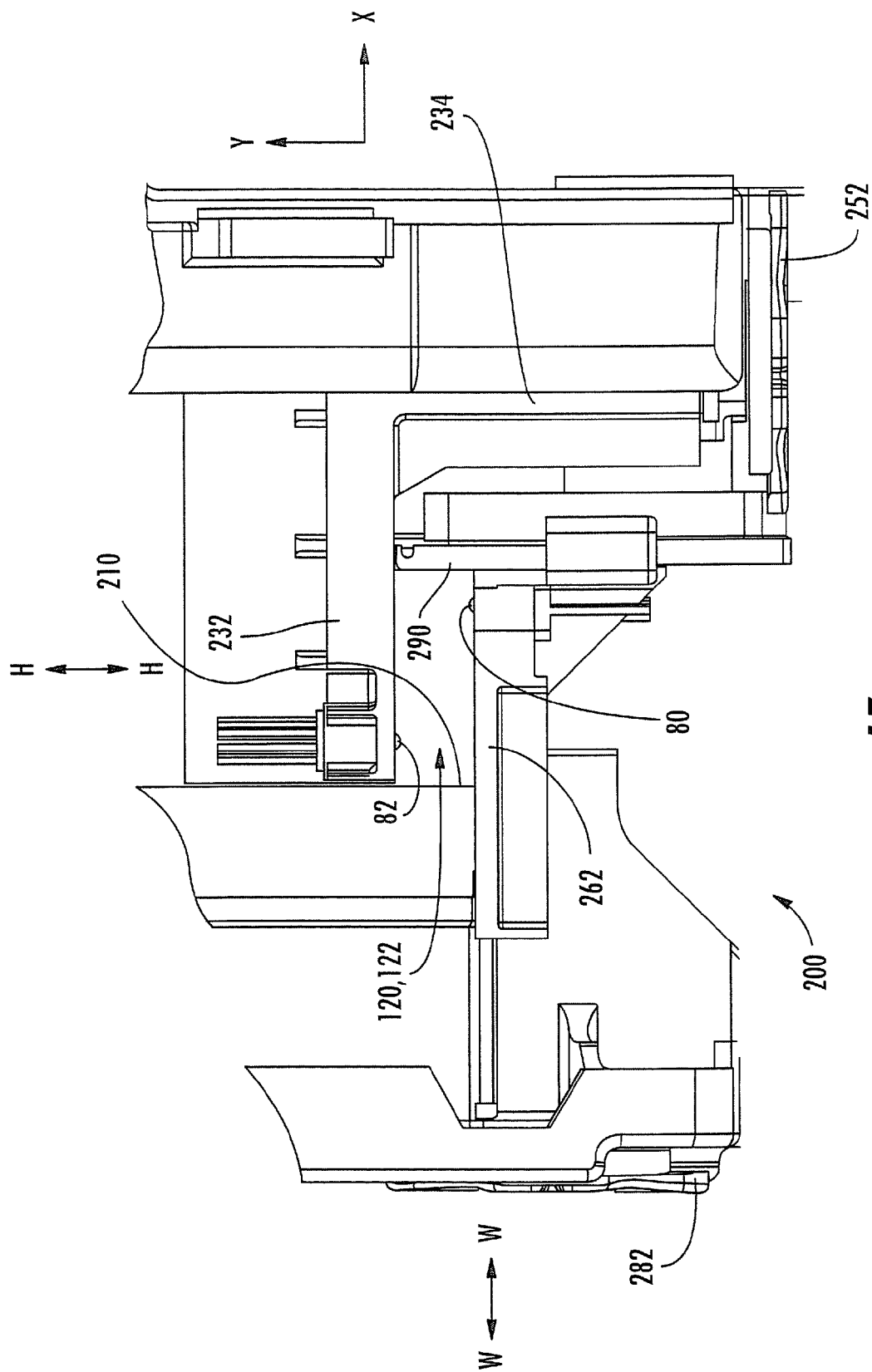
FIG. 17 is an enlarged, fragmentary, front end view of the bin of FIG. 4 with the nozzle thereof removed, wherein the dispensing channel subassembly thereof is positioned in a second position.
Figure 18:
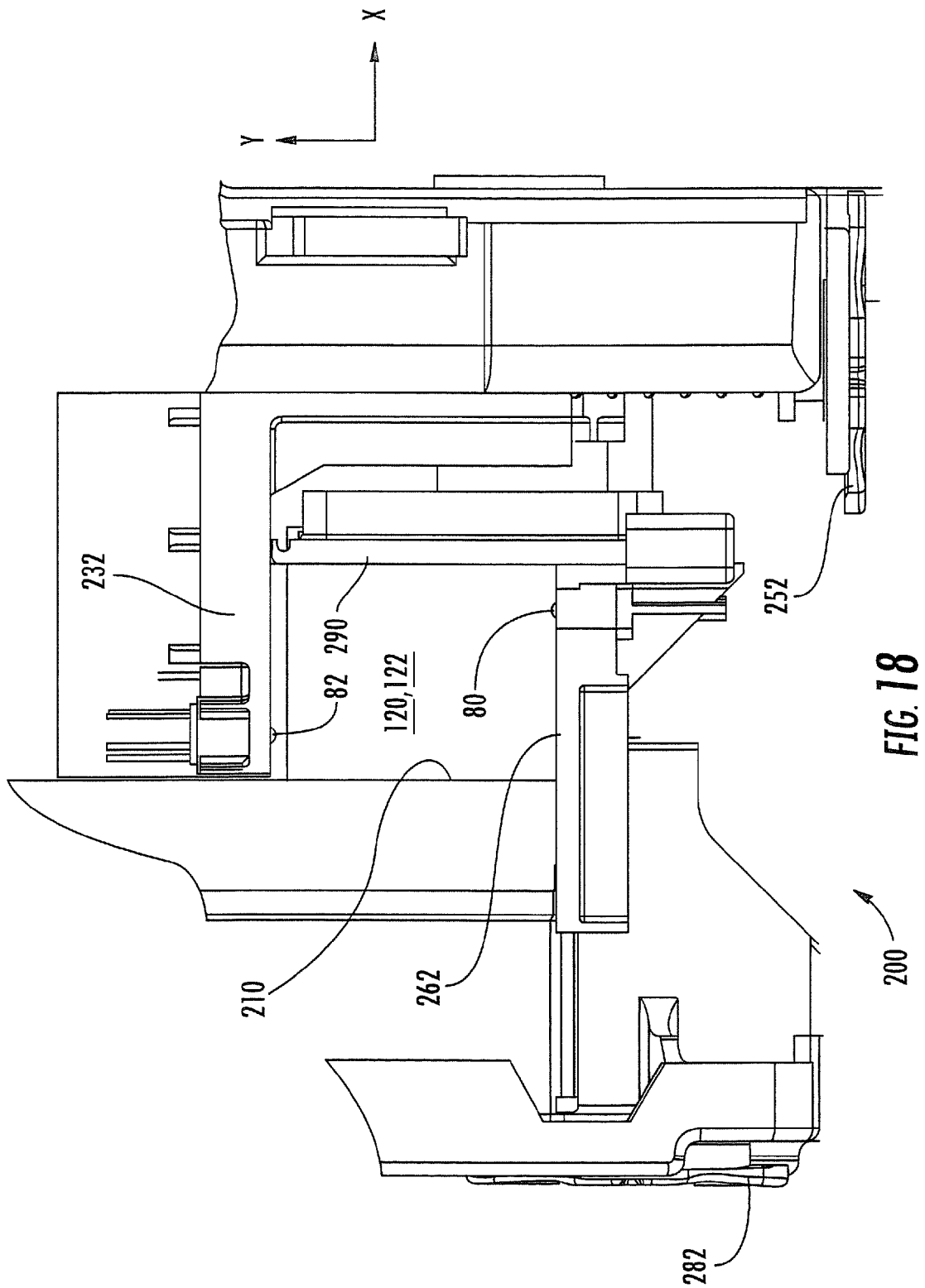
FIG. 18 is an enlarged, fragmentary, front end view of the bin of FIG. 4 with the nozzle thereof removed, wherein the dispensing channel subassembly thereof is positioned in a third position.
Figure 19:
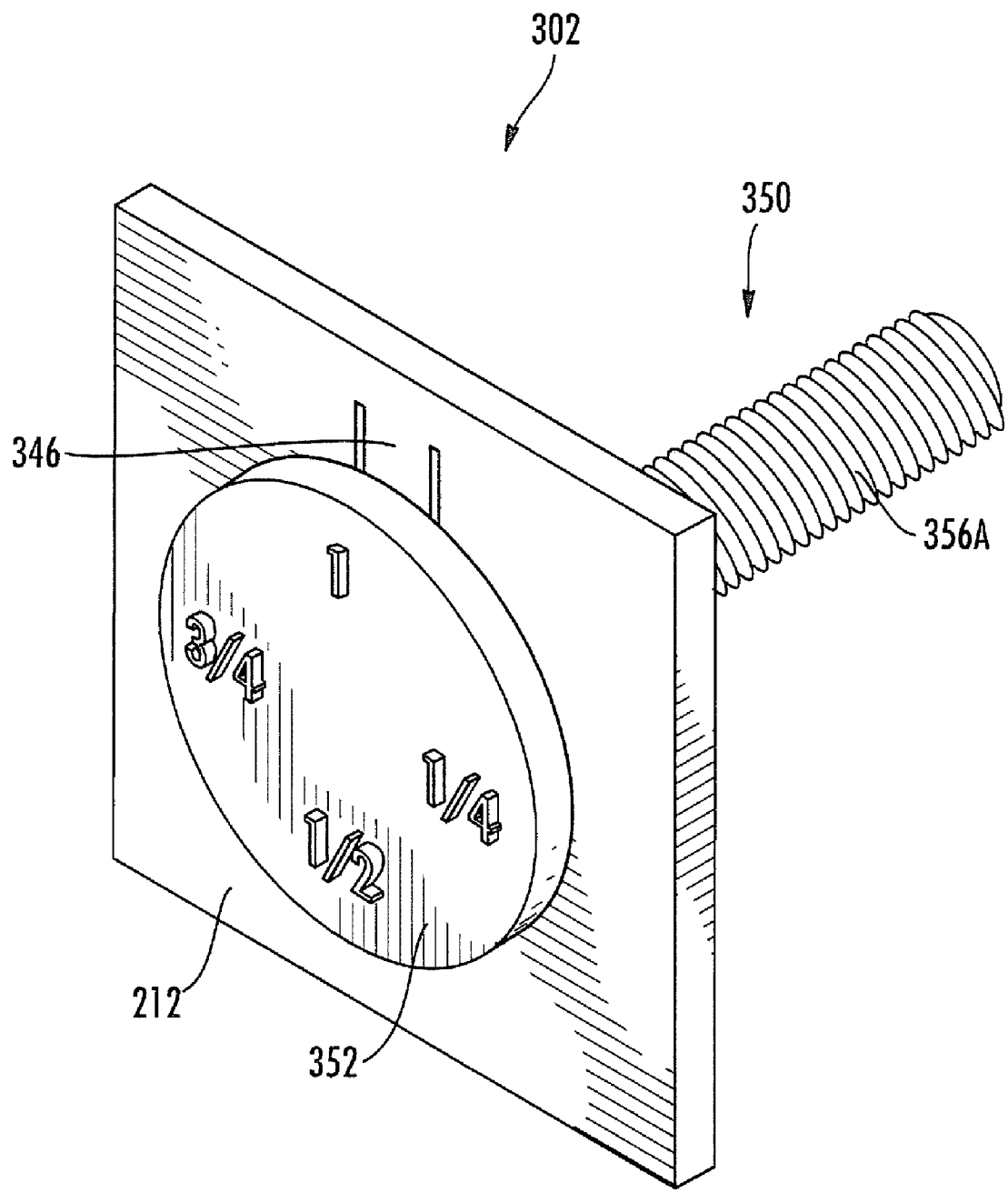
FIGS. 19 and 20 are enlarged, fragmentary, front perspective views of an adjustment mechanism according to further embodiments of the present invention.
Figure 20:
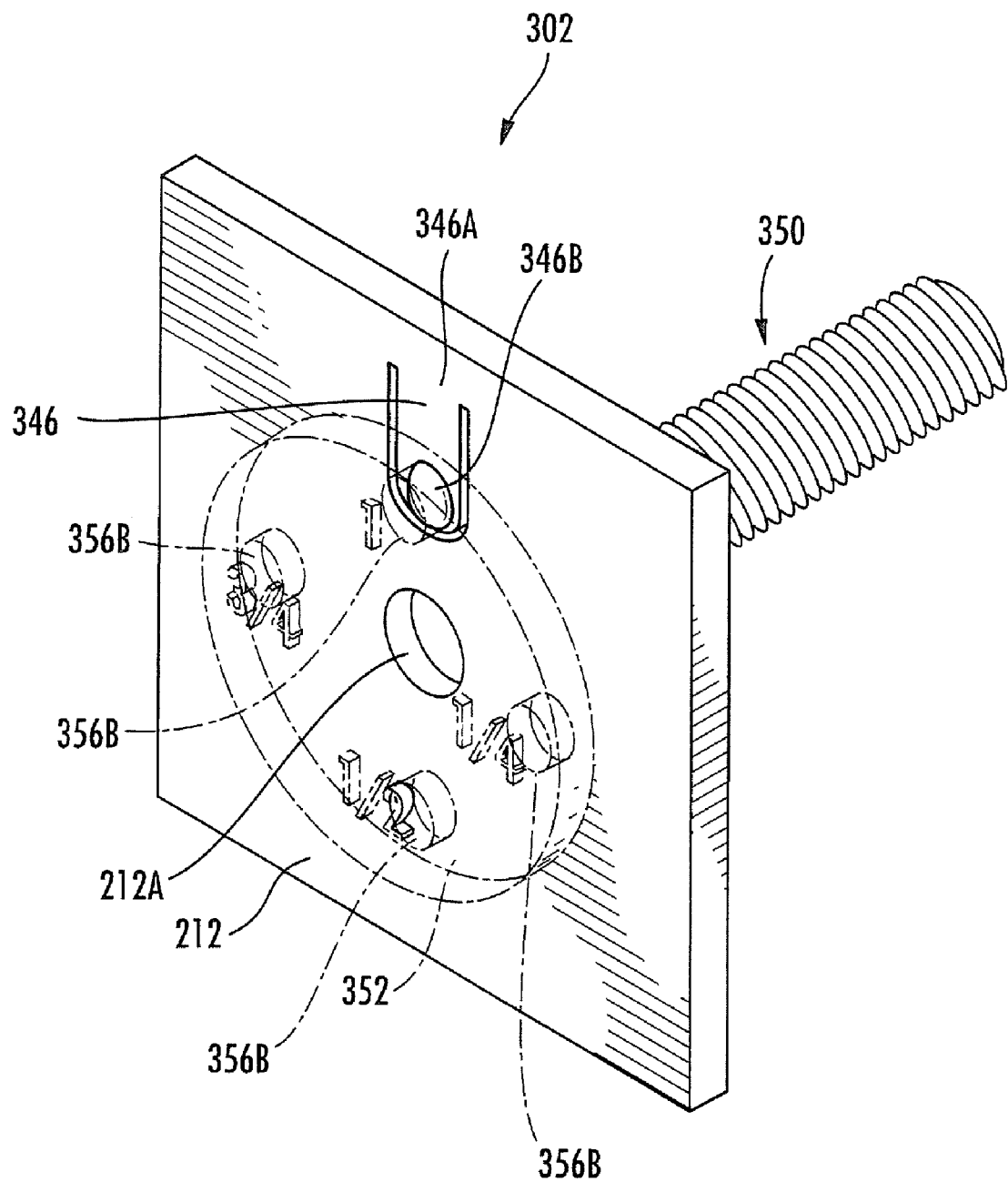
Figure 21:
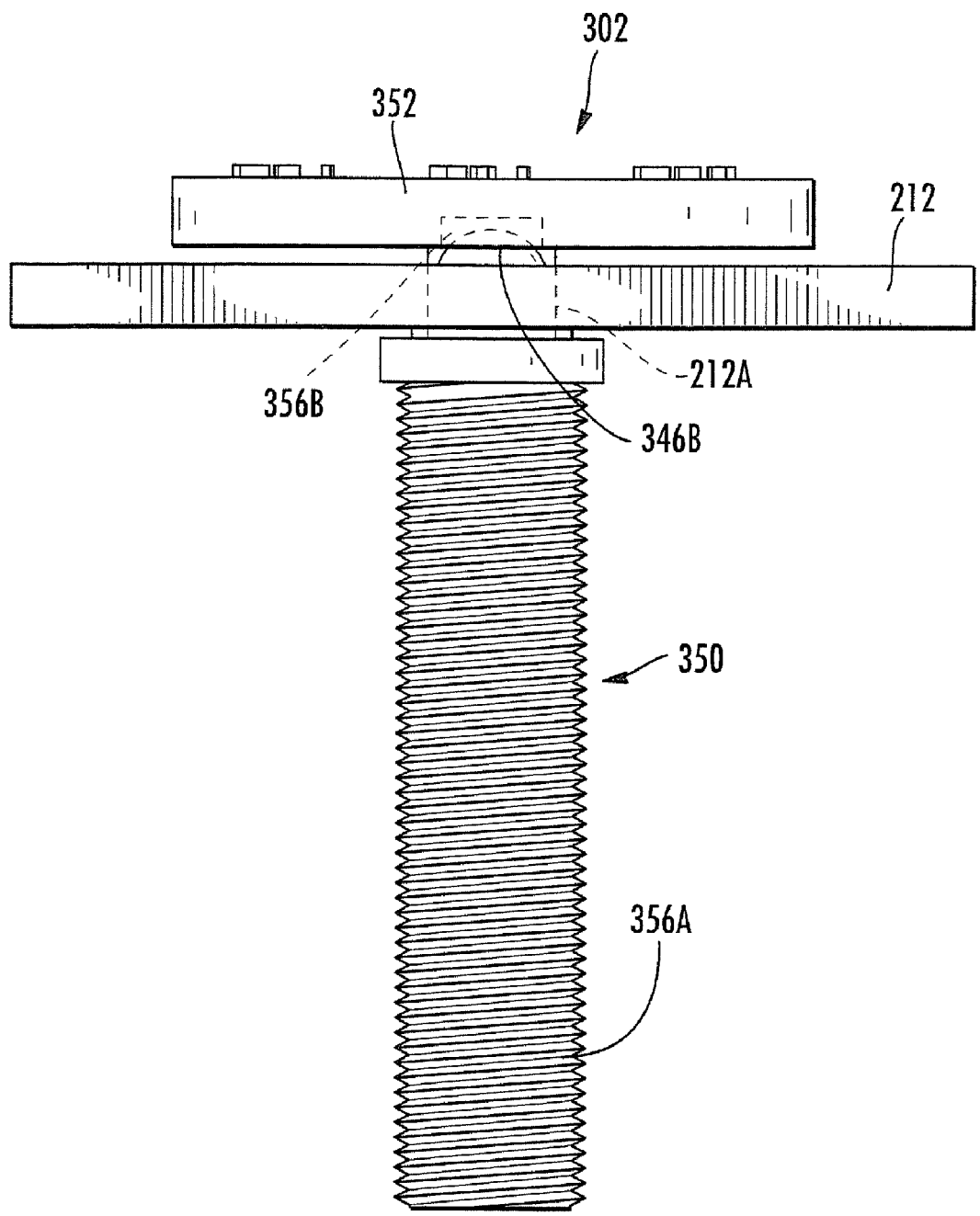
FIG. 21 is an enlarged, fragmentary, side view of the adjustment mechanism of FIG. 19.
Figure 22:
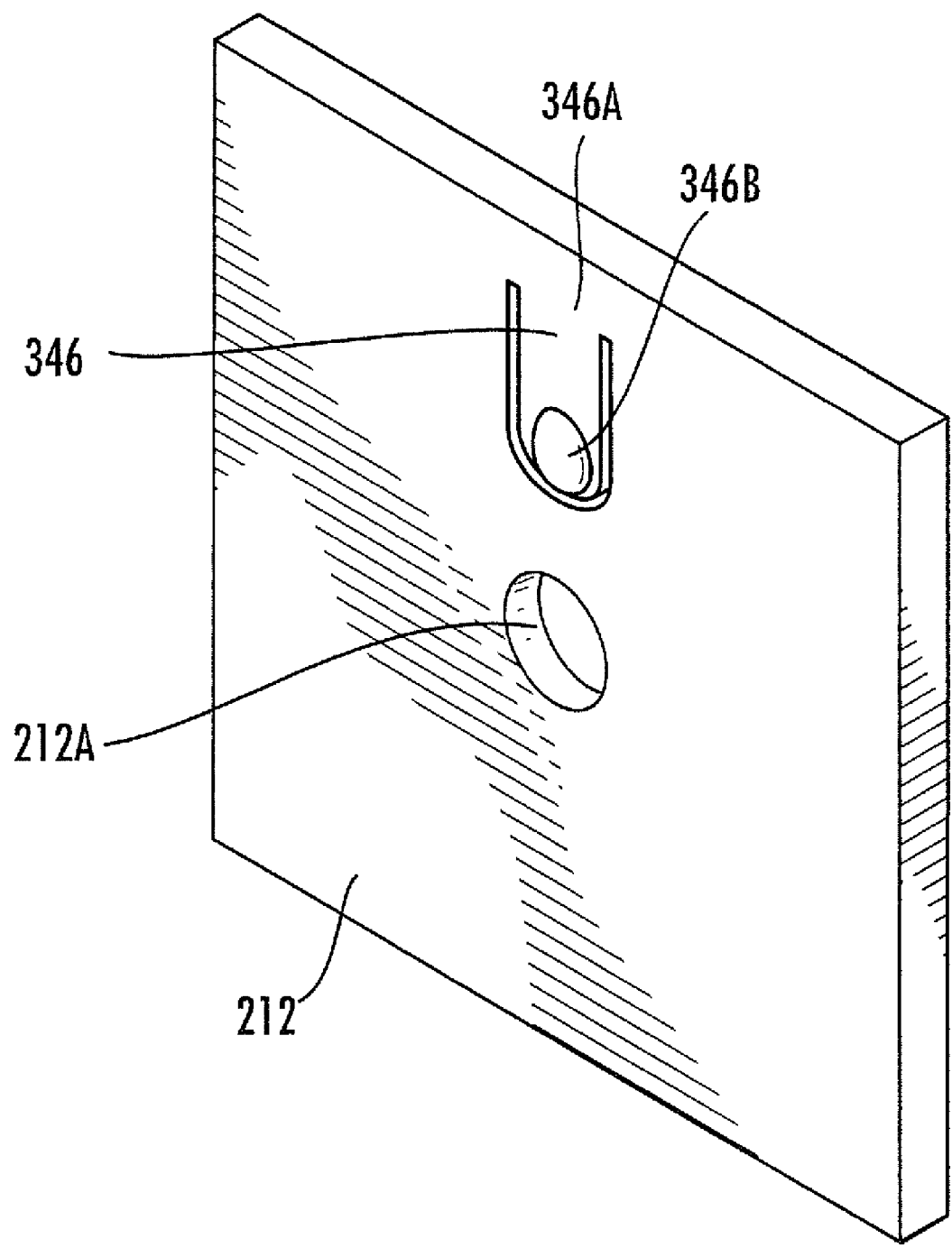
FIG. 22 is an enlarged, fragmentary, front perspective view of a wall portion including a tab forming a part of the adjustment mechanism of FIG. 19.
Figure 23:
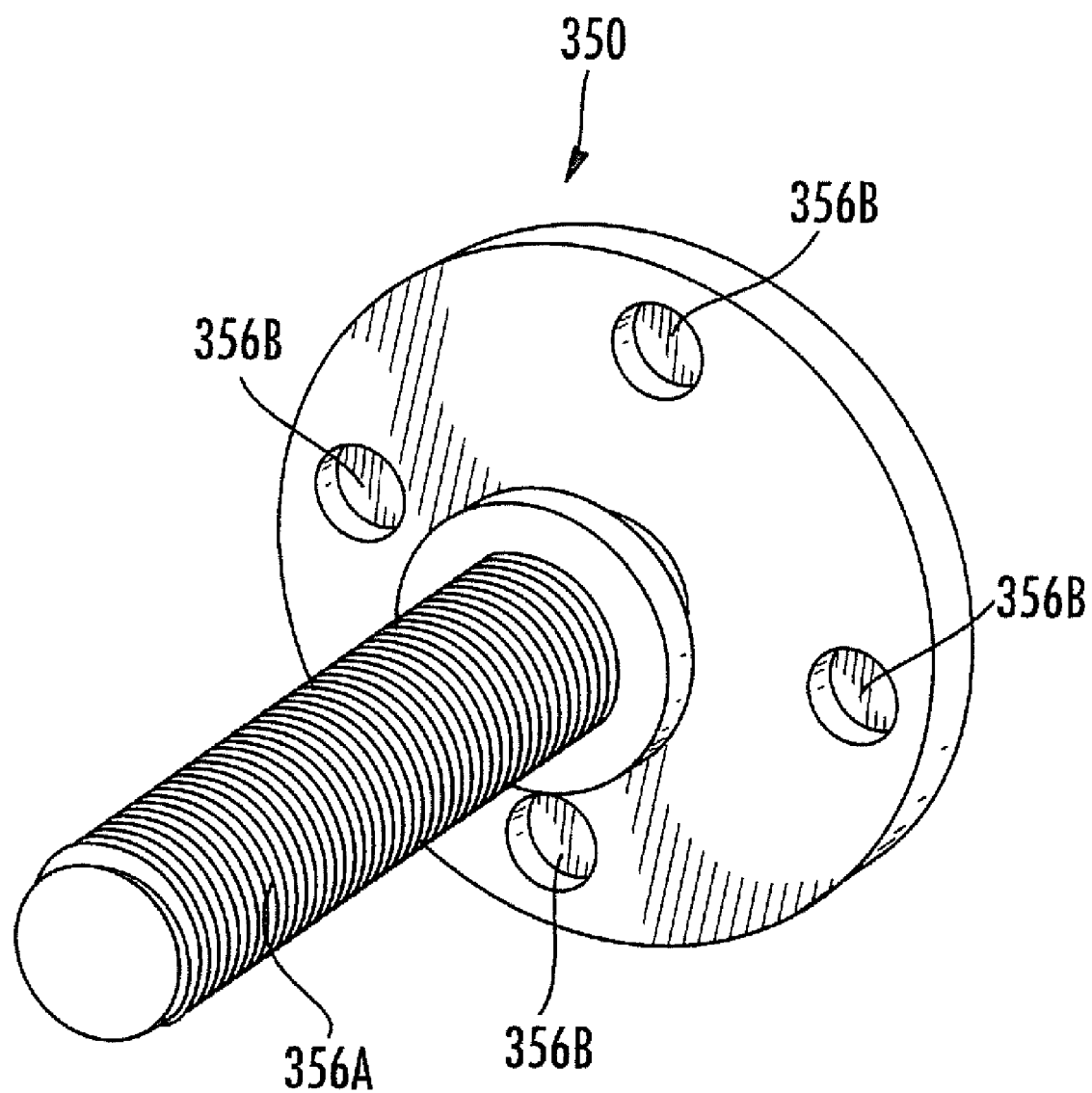
FIG. 23 is an enlarged, rear perspective view of an adjustment screw member forming a part of the adjustment mechanism of FIG. 19.
Figure 24:
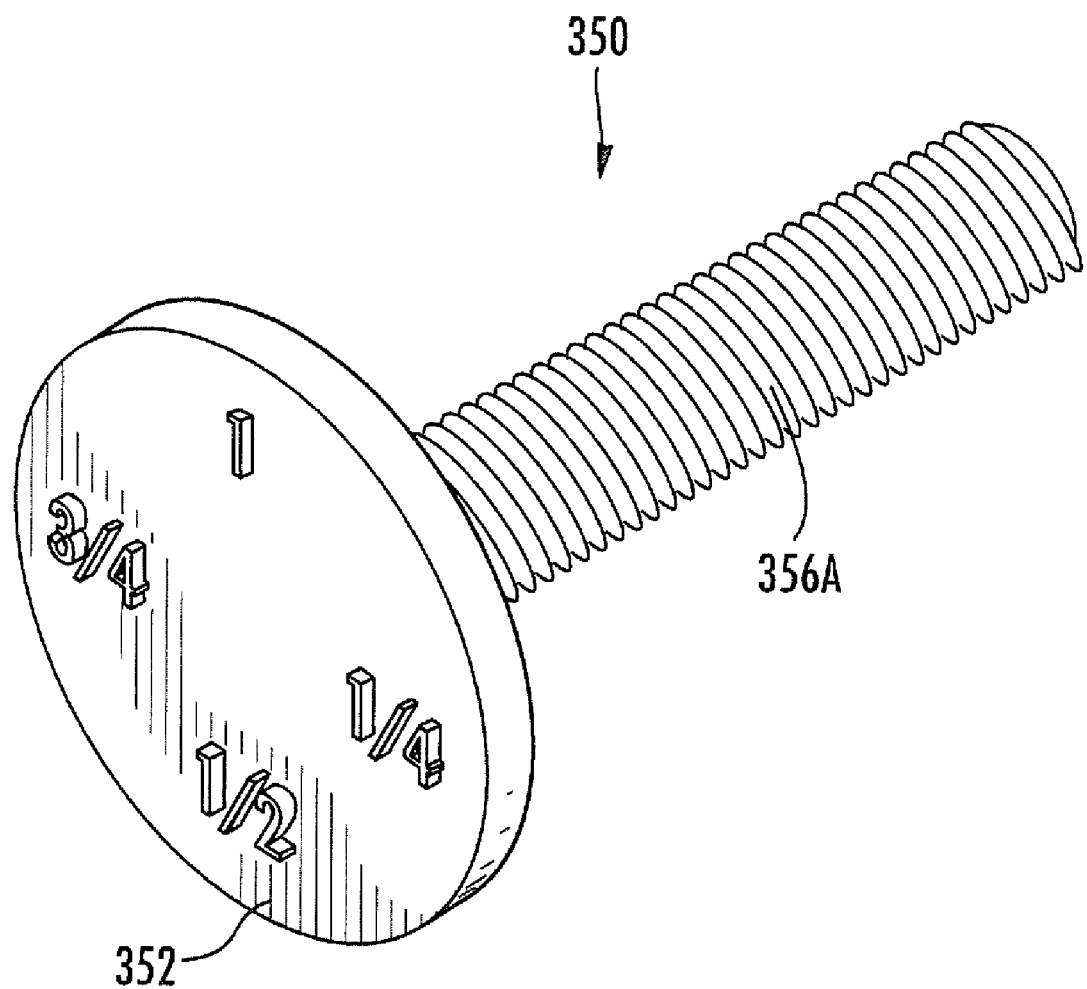
FIG. 24 is an enlarged, front perspective view of the adjustment screw member of FIG. 23.

The heightwise spacing between the floor wall 262 and the ceiling wall 232 can be adjusted by rotating the screw member 250 in the corresponding direction using the knob 252. The threads 242B and 256A cooperate to drive the ceiling member 230 along the axis H-H. The threads 242B and 256A cooperate to drive the ceiling member 230 upward when the screw member 250 is rotated counterclockwise (viewed from below) and to drive the ceiling member 230 downward when the screw member 250 is rotated clockwise. The rib 242 and the slot 212B guide the movement of the ceiling member 230. The follower member 290 moves up and down with the ceiling member 230 and slides along the abutting side edge of the floor wall 262 and in the flange 264. The floor wall 262 remains vertically fixed so that the ceiling wall 232 translates relative thereto. By way of example, FIG. 17 shows the bin 100 with the dispensing channel 120 and the inlet 122 in a first configuration and FIG. 18 shows the bin 100 with the dispensing channel 120 and the inlet 122 in a second configuration having a greater height dimension. This adjustment may be made by rotating the screw member 250 in the counterclockwise direction.

The widthwise spacing between the fixed side wall 210 and the follower wall 290 can be adjusted by rotating the screw member 280 in the corresponding direction using the knob 282. The threads 272B and 286A cooperate to drive the floor member 260 along the axis W-W. The threads 272B and 286A cooperate to drive the floor member 260 rightward when the screw member 280 is rotated counterclockwise (viewed from the left side) and to drive the floor member 260 leftward when the screw member 280 is rotated clockwise. The rib 272 and the guide arms 216 guide the movement of the floor member 260. The follower member 290 moves left and right with the floor member 260 and slides left and right through the guide openings 238. The ceiling wall 232 remains laterally fixed so that the floor wall 262 and the follower wall 290 translate relative thereto. By way of example, FIG. 16 shows the bin 100 with the dispensing channel 120 and the inlet 122 in a first configuration and FIG. 17 shows the bin 100 with the dispensing channel 120 and inlet 122 in a second configuration having a greater width dimension. This adjustment may be made by rotating the screw member 280 in the counterclockwise direction.

Notably, the configuration of the dispensing channel 120 described above can provide an essentially "gapless" channel for the tablets to travel in, which can improve the performance of the system 40. Also, the floor wall 262 maintains its vertical position and the stationary wall 210 maintains its lateral position even when the dispensing channel 120 is adjusted, which provides a constant outlet location and thereby a constant location to which the container receiving tablets can be delivered.

According to some embodiments, the axes H-H and W-W are each traverse, and more particularly perpendicular, to the dispensing pathway. According to some embodiments, the axes H-H and W-W are perpendicular to one another.

The adjustment mechanisms 202, 204 can provide positive feedback to an operator when used by the operator to adjust and set the dimensions of the inlet 122 and dispensing channel 120. According to embodiments of the present invention, the feedback may be audible and/or tactile. According to some embodiments, the tactile and/or audible feedback indicates prescribed increments of movement of the wall or walls being adjusted by operation of the adjustment mechanism 202, 204. Such prescribed increments of movement of the wall or walls is also indicated by the indicia 212D, 263A to provide visual feedback to the operator.

Figure 15:
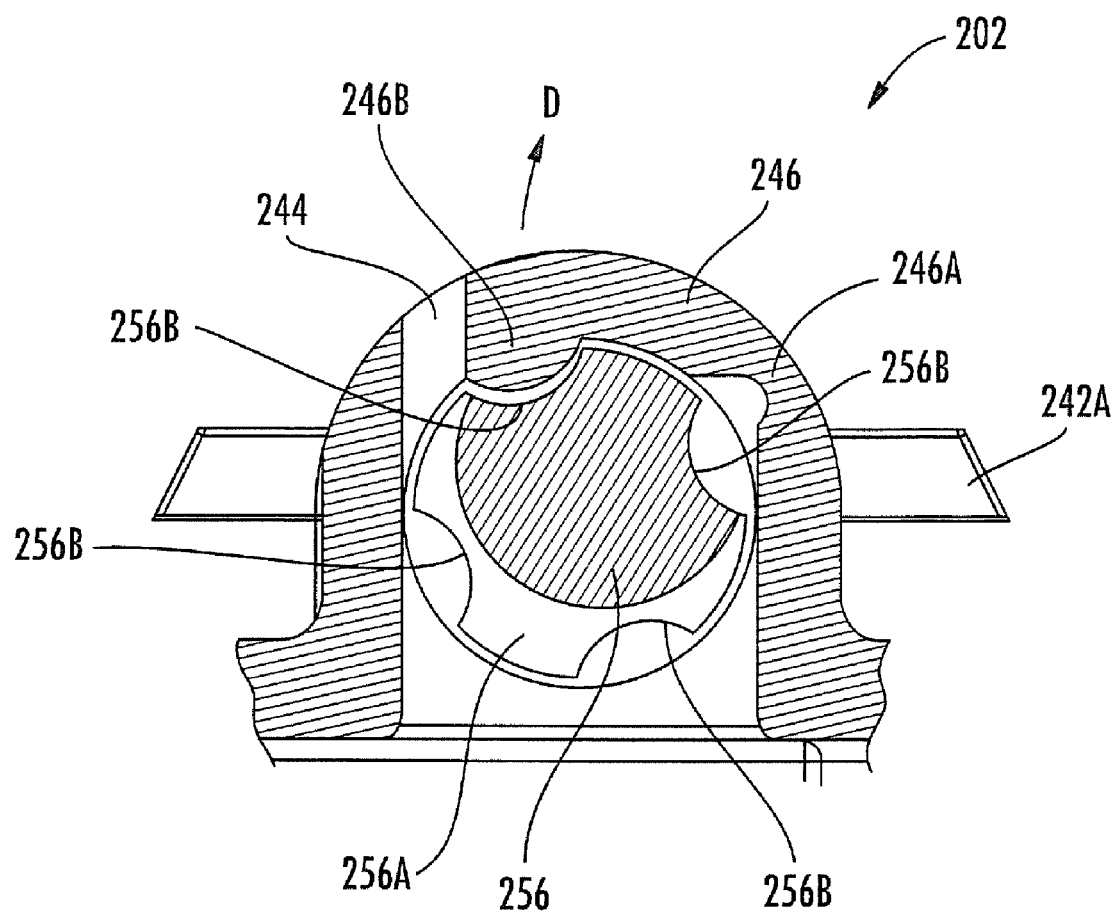
FIG. 15 is an enlarged, cross-sectional view of the adjustable dispensing channel subassembly of FIG. 8 along the line 15-15 of FIG. 13.

Referring to operation of the adjustment mechanism 202, as the screw member 250 is rotated, the tab 246 follows the thread 256A and the detents 256B. As the screw member 250 is rotated, the tab projection 246B moves in and out of the detents 256B of the screw member 250 and is deflected in a direction D (FIG. 15) by the thread 256A. More particularly, the projection 246B seats in a detent 256B when aligned with the detent (e.g., as shown in FIG. 15) and is radially outwardly displaced by the thread 256A when not aligned with a detent 256B. According to some embodiments, the tab 246 serves as a spring to bias the projection 246B against the thread 256A when the projection 246B is not seated in a detent 256B and, according to some embodiments, also biases the projection 246B into the detents 256B when aligned therewith.

According to some embodiments, the interaction between the detents 256B and the projection 246B causes a variation in the resistance to rotation of the screw member 250 that is readily detectable or sensible by the operator, thereby providing positive tactile feedback to the operator. According to some embodiments, the interaction between the detents 256B and the projection 246B generates an audible sound that is readily detectable or sensible by the operator, thereby providing positive audible feedback to the operator. For example, the projection 246B may make a clicking noise as it enters each detent 256B. According to some embodiments, the interaction between the detents 256B and the projection 246B generates both tactile and audible positive feedback.

In this manner, the screw member 250 and the tab 246 may serve as an operator feedback mechanism. The operator may use this tactile and/or audible feedback to more accurately or readily determine the degree of rotation of the screw member 250, and thereby the amount of change in the position of the ceiling wall 232. For example, in the illustrated embodiment wherein detents 256B are spaced at intervals of 90 degrees about the shank 256, the operator will receive positive feedback for each quarter turn (i.e., 90 degree rotation) of the screw member 250. The operator can use the tactile feedback to more accurately and conveniently track the heightwise adjustment of the inlet 122. The interlock between the detents 256B and the projection 246B may also serve to lock the adjustment in place.

The degree of rotation corresponds to the amount of translational movement of the ceiling wall 232. According to some embodiments, each tactile or audible click corresponds to and indicates a set amount or prescribed increment of movement of the ceiling wall 232. Thus, the tactile and/or audible feedback indicates to the operator prescribed increments of movement of the ceiling wall 232 relative to the floor wall 262 and, thereby, indicates prescribed increments in the change in the height of the inlet 122.

The operator may also monitor the position of the ceiling wall 232 with respect to the indicia 212D to determine the position of the ceiling wall 232. According to some embodiments, the indicia 212D indicate or correspond to prescribed increments of movement of the ceiling wall 232. According to some embodiments, these prescribed increments are the same as the prescribed increments indicated by the tactile and/or audible feedback. More particularly, according to some embodiments, the tactile and/or audible feedback indicates prescribed rotational positions of the screw member 250 and the prescribed rotational positions are indexed to prescribed ones of the indicia 212D. For example, each successive quarter turn of the screw member 250 may correspond to positioning of a reference point (that moves in tandem with the ceiling wall 232) in alignment with a corresponding successive one of the indicia 212D, which in turn corresponds to a successive incremental change in the position of the ceiling wall 232 and the height of the inlet 122. In the illustrated embodiment, the reference pointer is the top edge of the topmost, right tab 242A (referred to herein as "the pointer tab 242A") which in FIG. 13 is fully aligned with the index indicia "6." Other suitable reference pointers may be additionally or alternatively employed. For example, the top edge of the guide post 296 may serve as a reference pointer. As a further example, a reference pointer mark may be printed, embossed, molded or the like on the wall 234 and visible through the slot 212C. Co-indexing in this manner using both visual feedback (e.g., the positioning of the pointer tab 242A at the designated indicia 212D) and the tactile and/or audible feedback may provide the user with convenient and effective confirmation of adjustment. This may ensure or facilitate more accurate and faster reconfiguring of the inlet 122.

The operator may also refer to the tabs 252A and the indicia 252B on the knob 252 to assist in gauging the degree of rotation of the screw member 250.

The adjustment mechanism 204 may be used in a similar manner to provide tactile and/or audible feedback. When the screw member 280 is rotated, the projection (not shown) of the tab 276 corresponding to the projection 246B cooperates with the thread 286A and the detents 286B in the same manner as described above with respect to the tab 246 and the screw member 250 to provide tactile and/or audible feedback sensible by the operator and indicative of the incremental change in position of the floor wall 262 and the follower member 290. Also, the repositioning of the floor member 260 will slide the rear portion 263 in or out from the bottom wall 218 so that corresponding indicia 263A on the rear portion 263 aligns with the wall edge 218A (FIG. 14). The indicia 263A may thus provide visual indication of the position of the follower member 290. According to some embodiments, the indicia 263A indicate or correspond to prescribed increments of movement of the follower member 290 as discussed above with regard to the indicia 212D. According to some embodiments, these prescribed increments indicated by the tactile and/or audible feedback in the same manner as discussed above with regard to the adjustment mechanism 202.

According to some embodiments, each of the fixed visual markings 212D, 263A indicates a primary (integer) value of a setting, and the markings 252B, 282B on the screw members 250, 280 indicate a secondary (or decimal or fractional) value of the setting. The corresponding pointer (e.g., the pointer tab 242A or the wall edge 218A) only aligns exactly or closely with a primary mark at each full turn (not quarter turn) of the screw member 250, 280. The operator can read or determine the current setting by observing and determining the highest primary mark the pointer is aligned with or above (thereby determining the primary or integer value of the setting) and also determining the quarter-rotational position of the screw member (thereby determining the secondary or fractional value of the setting). An advantage of this configuration is that it allows the use of greater, easier to read spacings between the primary marks 212D, 263A, while still enabling more precise settings and setting determinations by use of the markings 252B, 282B.

According to some embodiments, the pitch of the screw threads 256A, 286A match the spacing of the corresponding indicia 212D, 263A so that each turn of the screw member 250, 280 causes the reference pointer to move the distance of one full increment between the marks 212D, 263A. Likewise, each quarter turn of the screw member 250, 280 will cause the reference pointer to move one quarter of the distance between marks 212D, 263A.

With reference to FIG. 5, the sensor system 102 includes an exit photoemitter 80, an exit photosensor or photodetector 82, an entrance photoemitter 84, an entrance photosensor or photodetector 86, the controller 42, and an emitter driver operative to monitor flow of tablets T through the dispensing channel 120. The photoemitter 80 and the photosensor 82 may cooperate as a first sensor pair facing each other across the dispensing channel 120 and the photoemitter 84 and the photosensor 86 may cooperate as a second sensor pair facing each other across the dispensing channel 120. Additionally, the first and second sensor pairs may be cooperatively used or monitored as disclosed in U.S. patent application Ser. No. 11/834,936, the disclosure of which is incorporated herein by reference.

According to some embodiments, the photoemitters 80, 84 are photoelectric emitters and the photodetectors 82, 86 are photoelectric sensors. According to some embodiments, the components 80, 82, 84, 86 may each include both a photoemitter and a photodetector, whereby the components 80, 82, 84, 86 may each serve as an emitter and a sensor, each configured to emit toward and receive from the other in its sensor pair. According to some embodiments, the components 80, 84 may each be replaced with a retroreflective photoemitter/photodetector device and the components 82, 86 may each be a cooperating reflector. The photodetectors 82, 86 are configured and positioned to detect the tablets T as they pass through the dispensing channel 120. The photoemitters 80, 84 and the photodetectors 82, 86 are operably connected to associated sensor receiver/processor electronics. According to some embodiments, the controller 42 uses detection signals from one or both of the photodetectors 82, 86 to count the dispensed tablets, to assess a tablet or tablets, and/or to determine conditions or performance in tablet dispensing. In some cases, the sensor system 102 operates the valves 142, 144 or other devices in response to identified or determined count, conditions or performance in dispensing.

In use, the operator may adjust or readjust the dimensions of the dispensing channel 120 by moving one or both of the walls 232, 290 relative to the walls 262 and 210, respectively, using the adjustment mechanisms 202, 204 as described above. Typically, the operator will make such an adjustment as part of the initial setup procedure when installing the bin 100 in the dispensing system 40. The adjustable dispensing channel subassembly 200 permits the dispensing channel 120 to be sized and shaped to complement tablets T of different dimensions within a range of dimensions. Thus, it is not necessary to preconfigure the bin 100 for a specific tablet size; rather, the bin 100 can be reconfigured by the operator to fit the intended tablet size.

In some cases, the operator may only adjust the dispensing channel subassembly 200 once, namely, from its factory settings to the settings appropriate for the tablets being dispensed from the bin. For example, only one adjustment may ever be needed where the bin 100 is indefinitely or permanently dedicated to dispensing a particular tablet size and/or shape.

In some cases, the operator may make such adjustments to the channel 120 between dispensing sessions in order to size the cross-section of the dispensing channel 120 to complement the size and configuration of the tablets to be dispensed next.

Exemplary operation of the dispensing system 40 will now be described. The bin 100 is filled with tablets T to be dispensed. The tablets T may initially be at rest. At this time, the valves 142, 144 are closed so that no gas flow is provided through the drive jet outlets 146, 148 or the agitation outlets 152, 154.

If desired, the adjustable dispensing channel system 200 is suitably adjusted using one or both of the adjustment mechanisms 202, 204 to provide the dispensing channel 120 and/or the inlet 122 with the appropriate dimensions for singulating the intended tablets T.

Figure 7:
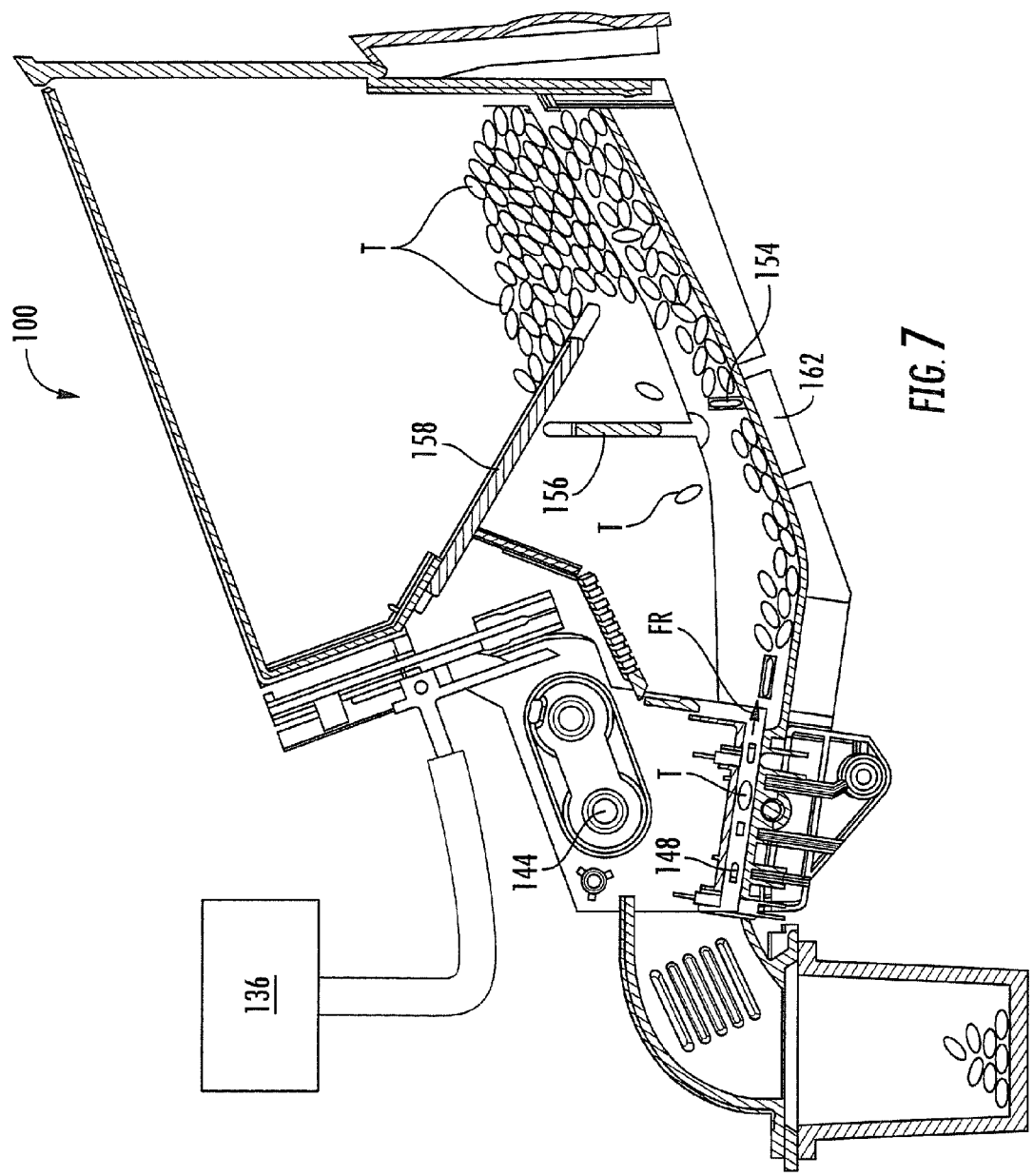
FIG. 7 is a cross-sectional view of the bin of FIG. 3 wherein a tablet is being returned to a hopper of the bin in a reverse direction.

When is it desired to dispense the tablets T to fill the container C, the dispensing carrier 70, directed by the controller 42, moves the container C to the exit port of the nozzle 114 of the selected dispensing bin 100. The controller 42 signals the forward valve 142 to open (while the reverse valve 144 remains closed). The opened valve 142 permits the pressurized gas from the gas source 136 to flow through the gas supply passages and out through the forward drive jet outlets 146. The pressurized flow from the forward drive jet outlets 146 creates high velocity gas jets that generate suction that causes a forward flow FF of high pressure, high velocity air to be drawn outwardly through the dispensing channel 120 (FIG. 7). Tablets T are oriented into a preferred orientation by the shape of the inlet 122 to the dispensing channel 120 and dispensed into the container C through the dispensing channel 120 and the outlet 124 under the force of the forward flow FF. The photodetectors 82, 86 detect the tablets T as they pass through respective predetermined points in the dispensing channel 120.

The opening of the valve 142 also simultaneously permits the pressurized supply gas from the gas source 136 to flow through the front air amplifier 160 and out through the front agitation outlet 152 as an agitation air flow having a relatively low velocity and high mass flow rate as compared to the gas flow from the forward drive jet outlets 146. The front agitation air flow flows through and lofts or otherwise displaces (i.e., agitates) the tablets T in the front subchamber 111A proximate the inlet 122. This agitation of the tablets T helps to orient the tablets T for singulated entry into the dispensing channel 120 and to prevent tablet jams. According to some embodiments, the forward jet gas flows and the front agitation flow are provided simultaneously.

Once dispensing is complete (i.e., a predetermined number of tablets has been dispensed and counted), the controller 42 activates the forward valve 142 to close and the reverse valve 144 to open. The opened valve 144 permits the pressurized gas from the gas source 136 to flow out through the reverse drive jet outlet 148. The pressurized flow from the jet outlet 148 creates a high velocity gas jet that generates suction that causes a reverse (i.e., rearward) flow FR of high pressure air to be drawn inwardly through the dispensing channel 120 toward the chamber 111. In this manner, the airflow is reversed and any tablets T remaining in the channel 120 are returned to the chamber 111 under the force of the reverse flow (FIG. 8).

The opening of the valve 144 also simultaneously permits the pressurized supply gas from the gas source 136 to flow through the rear air amplifier 160 and out through the rear agitation outlet 154 as a rear agitation air flow which has a relatively low velocity and high mass flow rate as compared to the gas flow from the jet outlet 148. The rear agitation air flow flows through and lofts or otherwise displaces (i.e., agitates) the tablets T in the front subchamber 111A and/or the intermediate subchamber 111B proximate the choke point between the partition wall 156 and the floor 150. This agitation of the tablets T helps to loosen the tablets T to permit return of the tablets T and to prevent or break tablet jams. According to some embodiments, the reverse jet gas flow and the rear agitation flow are provided simultaneously. According to some embodiments, the reverse valve 144 is opened and then closed after a relatively short period to provide the reverse flow FR and the rear agitation flow as short bursts.

Typically, an operator will request that a desired number of tablets be dispensed ("the requested count"). The sensor system 102 detects the tablets T as they pass through predetermined points in the dispensing channel 120, as discussed in more detail below. The controller 42 uses the detection signals from the photodetector 82 and/or the photodetector 86 to monitor and maintain a registered count of the tablets T dispensed ("the system count"). When the system count matches the requested count, the controller 42 will deem the dispensing complete and cease dispensing of the tablets T.

Following the first dispensing session, the operator may desire to execute a second or further dispensing session. However, the operator may desire to adjust one or both of the height dimension and the width dimension of the inlet 122. Such adjustment may be desired to accommodate new tablets having different dimensions than those of the tablets dispensed in the first dispensing session, for example. Such adjustment may also be used to improve dispensing performance of the same size tablets, for example, if tablet jams or other failures were encountered in the prior dispensing session. The inlet 122 may be adjusted using the dispensing channel dispensing system 200 and the second dispensing session is thereafter executed. Further adjustments to the inlet 122 may be made between subsequent dispensing sessions in the same manner.

Other mechanisms may be employed to provide tactile and/or audible positive feedback in accordance with embodiments of the present invention in addition to or in place of the detents 256B, 286B and the tabs 246, 286. For example, according to some embodiments, one of the knob 252 and the housing wall 212 includes a projection and the other includes a detent, and the projection and the detent selectively engage and disengage with one another to provide the tactile and/or audible feedback.

With reference to FIGS. 19-24, an adjustment mechanism 302 according to further embodiments of the present invention is shown therein. The adjustment mechanism 302 may be used in the bin 100 in place of either the adjustment mechanism 202, the adjustment mechanism 204 or both.

The adjustment mechanism 302 includes an adjuster screw member 350 and an arm or tab 346 having a projection 346B. The tab 346 is formed of a resilient material so that it may be elastically deflected about a pivot end 346A of the tab 346. The tab 346 may be a cutout in the wall 212, for example. The adjuster screw member 350 may correspond to the screw member 250 except that the detents 256B are not formed in the threads 356A and circumferentially spaced apart detents 356B are defined in the underside of the knob 352.

In use, the adjuster screw member 350 is rotated as described above to adjust the ceiling member 230 or the floor member 260, for example. As the knob 352 rotates over the projection 346B, the projection 346B is received in and displaced from (or snaps into and slides out of) the adjacent one of the detents 356B to provide tactile and/or audible feedback to the operator as discussed above, as well as to temporarily lock the adjustment in place. The cutout tab 346 operates as a natural spring to bias the projection 346B against the underside of the knob 352 and into the aligned one of the detents 356B.

Figure 25:
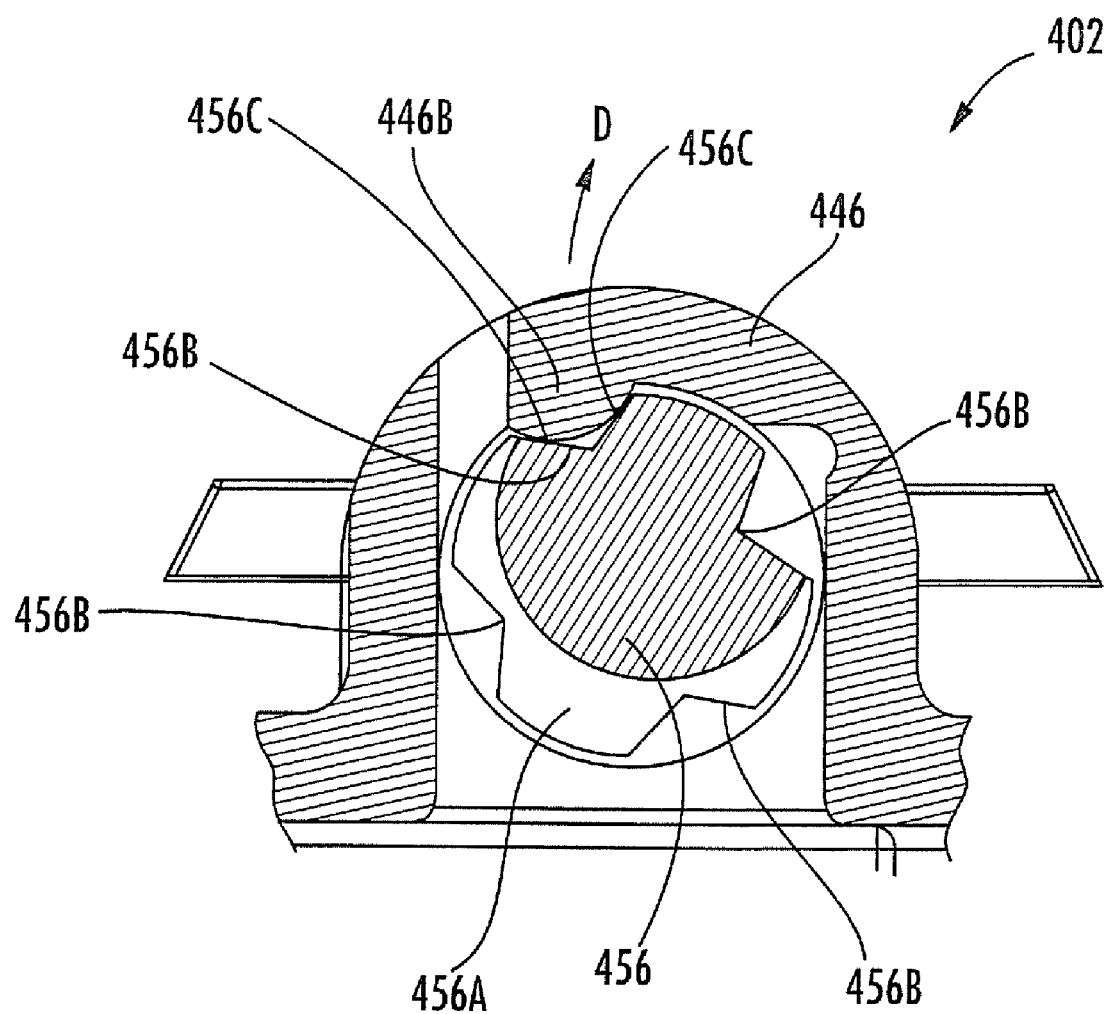
FIG. 25 is an enlarged, cross-sectional view of an adjustment mechanism according to further embodiments of the present invention.

With reference to FIG. 25, an adjustment mechanism 402 according to further embodiments of the present invention is shown therein. The adjustment mechanism 402 may be used in the bin 100 in place of either the adjustment mechanism 202, the adjustment mechanism 204, or both.

The adjustment mechanism 402 corresponds to the adjustment mechanism 202 except as follows. The view of FIG. 25 corresponds to the view of FIG. 15. The shank portion 456 has notches or detents 456B defined in the threads 456A thereof. The detents 456B differ from the detents 256B in that the detents 456B are substantially V-shaped and have opposed, generally flat side walls 456C. The projection 446B (on the tab 446), which may be arcuate, engages the thread 456A and seats in the detents 456B in the same manner as described above with respect to the adjustment mechanism 202. The adjustment mechanism 402 may be further advantageous because the round projection 446B engages the detent 456B at two contact points on the sidewalls 456C. This arrangement may provide additional resistance to inhibit the shank portion 456 from rotating.

While embodiments employing passed gas drive mechanisms are described herein, other embodiments the present invention may employ other drive mechanisms in place of or in addition to a drive gas flow. For example, the pharmaceutical articles may be passed in the forward and/or reverse direction by vibration and/or gravity.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An apparatus for dispensing pharmaceutical articles, the apparatus comprising:
  a) a housing assembly including a first inlet wall and a second inlet wall that is moveable relative to the first inlet wall, the housing assembly defining:
    a hopper chamber that houses pharmaceutical articles; and
    a dispensing channel fluidly connected to the hopper chamber, the dispensing channel having an inlet and an outlet and defining a flow path, the inlet being defined at least in part by the first and second inlet walls; and
  b) an adjustment system operable to adjust the position of the second inlet wall relative to the first inlet wall to adjust the size of the inlet to singulate the pharmaceutical articles passing through the inlet, the adjustment system including:
    an input mechanism selectively operable by an operator to selectively move the second inlet wall relative to the first inlet wall; and
    an operator feedback mechanism that provides tactile and/or audible feedback to the operator responsive to operation of the input mechanism by the operator to indicate prescribed increments of movement of the second inlet wall relative to the first inlet wall;
  wherein:
    the input mechanism includes a rotatable member that is rotatable relative to a mating portion of the apparatus;
    the operator feedback mechanism includes a detent and a projection, wherein one of the detent and the projection is located on the rotatable member and the other of the detent and the projection is located on the mating portion; and
    the projection engages the detent at a prescribed rotational position of the rotatable member to provide tactile and/or audible feedback to the operator as the operator rotates the rotatable member to and/or from the prescribed rotational position.

2. The apparatus of claim 1 including a plurality of detents and/or a plurality of projections each configured to engage a projection or a detent, respectively, to provide tactile and/or audible feedback to the operator as the operator rotates the rotatable member to and/or from a plurality of prescribed rotational positions.

3. The apparatus of claim 1 including a plurality of indicia on the housing assembly to indicate respective prescribed positions of the second inlet wall.

4. The apparatus of claim 3 wherein the prescribed rotational position is indexed to at least prescribed ones of the plurality of indicia.

5. The apparatus of claim 1 wherein:
  the rotatable member includes a threaded shank and a knob affixed thereto; and
  the adjustment system is configured such that rotation of the knob rotates the threaded shank, which in turn translates the second inlet wall relative to the first inlet wall.

6. The apparatus of claim 5 including:
  a plurality of indicia on the housing assembly to indicate respective prescribed positions of the second inlet wall;
  wherein the prescribed rotational position is indexed to at least prescribed ones of the plurality of indicia; and
  wherein the threaded shank has a thread pitch configured such that each full turn of the rotatable member corresponds to one full increment between the plurality of indicia.

7. The apparatus of claim 5 wherein one of the detent and the projection is located on the knob and the other of the detent and the projection is located on the mating portion.

8. The apparatus of claim 7 wherein:
  the detent is located on the knob;
  the mating portion includes a deflectable tab; and
  the projection is located on the deflectable tab.

9. The apparatus of claim 1 wherein:
  the rotatable member includes a shank having an external thread and the detent is defined in the thread; and
  the projection is located on the mating portion.

10. The apparatus of claim 9 wherein:
  the rotatable member includes a plurality of detents defined in the thread;
  the mating portion includes a deflectable tab; and
  the projection is located on the deflectable tab of the mating portion.

11. The apparatus of claim 9 wherein the detent is substantially V-shaped and the projection is arcuate.

12. The apparatus of claim 9 wherein the mating portion includes a second thread operatively engaging the thread of the shank.

13. The apparatus of claim 1 including a plurality of indicia on the housing assembly to indicate respective prescribed positions of the second inlet wall, wherein the tactile and/or audible feedback indicating prescribed increments of movement of the second inlet wall relative to the first inlet wall is indexed to the plurality of indicia.

14. The apparatus of claim 1 wherein the tactile and/or audible feedback includes tactile feedback.

15. The apparatus of claim 1 wherein the tactile and/or audible feedback includes audible feedback.

16. The apparatus of claim 1 wherein the second inlet wall is configured to translate relative to the first inlet wall in a direction perpendicular to the flow path.

17. The apparatus of claim 1 wherein the housing assembly includes a third inlet wall that is moveable relative to the first inlet wall and the inlet is defined at least in part by the third inlet wall.

18. The apparatus of claim 17 wherein the second inlet wall is configured to translate relative to the first inlet wall in a first direction perpendicular to the flow path, and the third inlet wall is configured to translate relative to the first inlet wall in a second direction perpendicular to the flow path and to the first direction.

19. The apparatus of claim 1 wherein the apparatus includes a drive mechanism operable to pass the articles along the dispensing path and through the inlet.

20. The apparatus of claim 19 wherein the drive mechanism includes a flow generator configured to generate at least one drive gas flow to pass articles along the dispensing path and through the inlet.

21. The apparatus of claim 1 wherein:
the housing assembly includes a third inlet wall that is moveable relative to the first inlet wall and defining, at least in part, the inlet; and
the apparatus further includes a second adjustment system operable to adjust the position of the third inlet wall relative to the first inlet wall to adjust the size of the inlet to singulate the pharmaceutical articles passing through the inlet, the second adjustment system including:
a second input mechanism selectively operable by an operator to selectively move the third inlet wall relative to the first inlet wall; and
a second operator feedback mechanism that provides tactile and/or audible feedback to the operator responsive to operation of the second input mechanism by the operator to indicate prescribed increments of movement of the third inlet wall relative to the first inlet wall.

22. The apparatus of claim 21 wherein the second wall is movable relative to the housing along a first axis and the third wall is movable relative to the housing along a second axis transverse to the first axis.

23. The apparatus of claim 22 wherein the second axis is perpendicular to the first axis.

24. A method for dispensing pharmaceutical articles, the method comprising:
providing an apparatus comprising:
a housing assembly including a first inlet wall and a second inlet wall that is moveable relative to the first inlet wall, the housing assembly defining:
a hopper chamber that houses pharmaceutical articles; and
a dispensing channel fluidly connected to the hopper chamber, the dispensing channel having an inlet and an outlet and defining a flow path, the inlet being defined at least in part by the first and second inlet walls; and
an adjustment system operable to adjust the position of the second inlet wall relative to the first inlet wall to adjust the size of the inlet to singulate the pharmaceutical articles passing through the inlet, the adjustment system including:
an input mechanism selectively operable by an operator to selectively move the second inlet wall relative to the first inlet wall; and
an operator feedback mechanism that provides tactile and/or audible feedback to the operator responsive to operation of the input mechanism by the operator to indicate prescribed increments of movement of the second inlet wall relative to the first inlet wall; and
using the input mechanism, adjusting the position of the second inlet wall relative to the first inlet wall to adjust the size of the inlet to singulate the pharmaceutical articles passing through the inlet;
wherein:
the input mechanism includes a rotatable member that is rotatable relative to a mating portion of the apparatus;
the operator feedback mechanism includes a detent and a projection, wherein one of the detent and the projection is located on the rotatable member and the other of the detent and the projection is located on the mating portion; and the projection engages the detent at a prescribed rotational position of the rotatable member to provide tactile and/or audible feedback to the operator as the operator rotates the rotatable member to and/or from the prescribed rotational position.

25. The method of claim 24 including:
using the input mechanism, adjusting the position of the second inlet wall relative to the first inlet wall to adjust the configuration of the inlet to a first configuration to singulate the pharmaceutical articles passing through the inlet; thereafter
executing a first counting session including passing the articles along a flow path with the inlet in the first configuration; thereafter
using the input mechanism, adjusting the position of the second inlet wall relative to the first inlet wall to adjust the configuration of the inlet to a second configuration to singulate the pharmaceutical articles passing through the inlet, wherein the second configuration is different from the first configuration; and thereafter
executing a second counting session including passing the articles along the dispensing pathway of the apparatus with the inlet in the second configuration.

26. The method of claim 24 including using a drive mechanism to pass the articles along the dispensing path and through the inlet.

27. The method of claim 26 including generating at least one drive gas flow using a flow generator to force articles along the dispensing path and through the inlet.

28. An apparatus for dispensing pharmaceutical articles, the apparatus comprising:
a) a housing assembly including a first inlet wall and a second inlet wall that is moveable relative to the first inlet wall, the housing assembly defining:
a hopper chamber that houses pharmaceutical articles; and
a dispensing channel fluidly connected to the hopper chamber, the dispensing channel having an inlet and an outlet and defining a flow path, the inlet being defined at least in part by the first and second inlet walls; and
b) an adjustment system operable to adjust the position of the second inlet wall relative to the first inlet wall to adjust the size of the inlet to singulate the pharmaceutical articles passing through the inlet, the adjustment system including:
an input mechanism selectively operable by an operator to selectively move the second inlet wall relative to the first inlet wall; and
an operator feedback mechanism that provides audible feedback to the operator responsive to operation of the input mechanism by the operator to indicate prescribed increments of movement of the second inlet wall relative to the first inlet wall.

29. The apparatus of claim 28 wherein:
the rotatable member includes a threaded shank and a knob affixed thereto; and
the adjustment system is configured such that rotation of the knob rotates the threaded shank, which in turn translates the second inlet wall relative to the first inlet wall.

30. The apparatus of claim 28 including a plurality of indicia on the housing assembly to indicate respective prescribed positions of the second inlet wall, wherein the audible feedback indicating prescribed increments of movement of the second inlet wall relative to the first inlet wall is indexed to the plurality of indicia.

31. The apparatus of claim 28 wherein the apparatus includes a drive mechanism operable to pass the articles along the dispensing path and through the inlet.

32. An apparatus for dispensing pharmaceutical articles, the apparatus comprising:
   a) a housing assembly including a first inlet wall and a second inlet wall that is moveable relative to the first inlet wall, the housing assembly defining:
      a hopper chamber that houses pharmaceutical articles; and
      a dispensing channel fluidly connected to the hopper chamber, the dispensing channel having an inlet and an outlet and defining a flow path, the inlet being defined at least in part by the first and second inlet walls; and
   b) an adjustment system operable to adjust the position of the second inlet wall relative to the first inlet wall to adjust the size of the inlet to singulate the pharmaceutical articles passing through the inlet, the adjustment system including:
      an input mechanism selectively operable by an operator to selectively move the second inlet wall relative to the first inlet wall; and
      an operator feedback mechanism that provides tactile and/or audible feedback to the operator responsive to operation of the input mechanism by the operator to indicate prescribed increments of movement of the second inlet wall relative to the first inlet wall;
   wherein:
      the housing assembly includes a third inlet wall that is moveable relative to the first inlet wall and defining, at least in part, the inlet;
      the apparatus further includes a second adjustment system operable to adjust the position of the third inlet wall relative to the first inlet wall to adjust the size of the inlet to singulate the pharmaceutical articles passing through the inlet, the second adjustment system including:
         a second input mechanism selectively operable by an operator to selectively move the third inlet wall relative to the first inlet wall; and
         a second operator feedback mechanism that provides tactile and/or audible feedback to the operator responsive to operation of the second input mechanism by the operator to indicate prescribed increments of movement of the third inlet wall relative to the first inlet wall;
      the second wall is movable relative to the housing along a first axis and the third wall is movable relative to the housing along a second axis transverse to the first axis; and
      the second axis is perpendicular to the first axis.

33. A method for dispensing pharmaceutical articles, the method comprising:
   providing an apparatus comprising:
      a housing assembly including a first inlet wall and a second inlet wall that is moveable relative to the first inlet wall, the housing assembly defining:
         a hopper chamber that houses pharmaceutical articles; and
         a dispensing channel fluidly connected to the hopper chamber, the dispensing channel having an inlet and an outlet and defining a flow path, the inlet being defined at least in part by the first and second inlet walls; and
      an adjustment system operable to adjust the position of the second inlet wall relative to the first inlet wall to adjust the size of the inlet to singulate the pharmaceutical articles passing through the inlet, the adjustment system including:
         an input mechanism selectively operable by an operator to selectively move the second inlet wall relative to the first inlet wall; and
         an operator feedback mechanism that provides audible feedback to the operator responsive to operation of the input mechanism by the operator to indicate prescribed increments of movement of the second inlet wall relative to the first inlet wall; and
   using the input mechanism, adjusting the position of the second inlet wall relative to the first inlet wall to adjust the size of the inlet to singulate the pharmaceutical articles passing through the inlet.

* * * * *